(12) United States Patent
Takahashi et al.

(10) Patent No.: US 6,196,173 B1
(45) Date of Patent: Mar. 6, 2001

(54) VALVE TIMING CONTROL SYSTEM FOR INTERNAL COMBUSTION ENGINE

(75) Inventors: Tatsuhiko Takahashi, Hyogo; Atsuko Hashimoto, Tokyo; Satoshi Wachi, Tokyo; Hirofumi Ohuchi, Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/435,030

(22) Filed: Nov. 5, 1999

(30) Foreign Application Priority Data

May 20, 1999 (JP) .................................................. 11-140299

(51) Int. Cl.$^7$ ..................................................... F02D 13/02
(52) U.S. Cl. ..................................... 123/90.15; 123/90.17
(58) Field of Search ............................. 123/90.15, 90.16, 123/90.17, 90.18

(56) References Cited

U.S. PATENT DOCUMENTS

| 5,333,577 | * | 8/1994 | Shinojima | 123/90.15 |
| 5,562,071 | * | 10/1996 | Urushihata et al. | 123/90.15 |
| 5,611,304 | * | 3/1997 | Shinojima | 123/90.15 |
| 5,623,896 | * | 4/1997 | Kato et al. | 123/90.15 |
| 5,937,806 | * | 8/1999 | Lyko et al. | 123/90.15 |
| 5,937,808 | * | 8/1999 | Kako et al. | 123/90.15 |
| 6,024,061 | * | 2/2000 | Adachi et al. | 123/90.17 |

FOREIGN PATENT DOCUMENTS 6-299876  10/1994  (JP) .

\* cited by examiner

Primary Examiner—Weilun Lo
(74) Attorney, Agent, or Firm—Sughrue, Mion, Zinn, Macpeak & Seas, PLLC

(57) ABSTRACT

A valve timing control system comprises a learning means for learning the phase difference between the crank angle and the cam angle at a position where the variable valve timing means is stopped mechanically and a valve timing control variable calculating means for calculating a valve timing control variable, for driving the variable valve timing means, on the basis of a deviation between the phase difference value learned by the learning means and the phase difference calculated by the advance amount calculating means. The learning means learns the phase difference between the crank angle and the cam angle at the mechanically stopped position when the internal combustion engine is not idling. Thus, errors resulting from the operating force of a cam shaft are not included in the maximum retardation value, which ensures precise learning of the maximum retardation value and high-precision valve timing control.

12 Claims, 17 Drawing Sheets

VALVE TIMING CONTROL SYSTEM FOR INTERNAL COMBUSTION ENGINE

BACKGROUND OF THE INVENTION

1. Field of the Invention

The present invention relates to a valve timing control system for an internal combustion engine, which is for controlling the valve timing of the internal combustion engine.

2. Description of the Related Art

FIG. 13 is a conceptual illustration of a configuration of an internal combustion engine including a valve timing mechanism, disclosed in Japanese Patent Application Laid-open No. 6-299876.

As FIG. 13 shows, an internal combustion engine 1, including a conventional valve timing control system, is equipped with an air cleaner 2, an air flow sensor 3, a throttle valve 4, a throttle sensor 5, an intake pipe 6, an injector 7, an ignition plug 8, an exhaust pipe 9, an $O_2$ sensor 10, a catalytic converter 11, a sensor plate 12, a crank angle sensor 13, a sensor plate 14, a cam angle sensor 15, an oil control valve 16, an ECU 17 and an ignition coil 18.

Moreover, as shown in FIG. 14, a housing 21, a rotor 22, a retarding chamber 23, and an advancing chamber 24 constitute a VVT (Variable Valve Timing) actuator 20.

The air cleaner 2 is installed at an opening of the intake pipe 6 to clean the air the internal combustion engine 1 intakes. The airflow sensor 3 is installed on the downstream side of the air cleaner 2 to sense the air intake amount into the internal combustion engine 1. The throttle valve 4 is opened and closed in connection with the accelerator pedal to adjust the air intake amount. The throttle sensor 5 detects the opening degree of the throttle valve 4.

In such an internal combustion engine, when the driver steps on the accelerator pedal, the throttle valve 4 opens/closes, so that air is mixed with a fuel injected from the injector 7 and this air-fuel mixture is introduced into cylinders. The fuel-air mixture is then ignited by the ignition plug 8 to push the pistons downward by the combustion thereof, thereby causing the crank shaft to rotate. The rotation of the crank shaft is derived as the output of the internal combustion engine.

With this operation of the internal combustion engine, the $O_2$ sensor 10 detects the residual oxygen amount in the exhaust gas. The catalytic converter 11 simultaneously removes THC, CO and NOx which are harmful gases.

FIGS. 14 and 15 are enlarged illustrations of an essential portion of the VVT actuator.

In FIG. 14, the VVT (Variable Valve Timing) actuator 20 is situated on the intake side, and is composed of the housing 21, the rotor 22, the retarding chamber 23 and the advancing chamber 24.

The rotor 22 is fixedly fitted on a cam shaft (not shown) to keep a constant positional relationship (for example, the positional relationship shown in FIG. 14) with respect to the housing 21.

A timing belt, timing chain or the like (not shown) is set on the housing 21. This timing belt or the like is also placed on a crank shaft (not shown).

With this structure, the rotation of the crank shaft causes the rotation of the cam shaft through the timing belt or the like.

Furthermore, the oil control valve 16 controls the oil pressure to be applied to the VVT actuator 20 fitted to the cam shaft.

Thus, in order to vary the valve timing in the internal combustion engine, the ECU 17 controls the VVT actuator 20 through the oil control valve 16 to adjust the amount of the lubricating oil to be supplied to the retarding chamber 23 and the advancing chamber 24.

The ECU 17 shifts the relative position of the rotor 22 with respect to the housing 21, for example, from the position shown in FIG. 14 to the position shown in FIG. 15, thereby changing the valve timing.

FIG. 16 is a graph showing the characteristics of the relationship between valve timing-and valve overlap. In this case, the term "valve overlap" signifies the overlap between the time period during which the intake valve is in the open condition and the time period during which the exhaust valve is in the open condition.

For instance, in order to retard the valve timing of the intake valve, the oil control valve 16 supplies the oil to the retarding chamber 23. At this time, the rotor 22 is rotated counterclockwise with respect to the housing 21, and the valve timing of the intake valve is retarded (in the direction indicated by arrow A in FIG. 16), so that the valve overlap decreases.

On the other hand, if the valve timing of the intake valve is advanced (in the direction indicated by the arrow B in FIG. 16), the valve overlap increases.

Furthermore, in the case of retarding the valve timing of the intake valve to a maximum, the housing 21 is brought into contact with the rotor 22 and is fixed at the position (see FIG. 15) where it stops mechanically, this being the position where the valve overlap assumes the minimum value.

In the following description, the advance amount in the case where the valve timing of the intake valve assumes this position will be referred to as a maximum retardation value, and in this case the valve timing of the intake valve is expressed as being at the maximum retardation position.

In the valve timing control for the internal combustion engine, the substantial advance amount (which will be referred to hereinafter as a VVT control variable) by the VVT mechanism is determined with the aforesaid maximum retardation value being employed as a reference. Moreover, this valve timing control is implemented by the ECU 17. The optimal valve timing required for the internal combustion engine varies according to the operating conditions. Therefore, the ECU 17 always controls the valve timing according to the operational conditions.

For instance, a ROM of the ECU 17 retains a two-dimensional map for determining a desired advance amount on the basis of the engine speed detected by the crank angle sensor 13 and the intake amount sensed by the air flow sensor 3.

Thus, the ECU 17 controls the valve timing so that the VVT controlled amount (variable) coincides with the desired advance amount obtained from the two-dimensional map on the basis of the engine speed and the intake amount.

As mentioned above, the desired advance amount is stored in the form of a deviation of the advance amount from the maximum retardation value employed as a reference, and signifies a desired VVT control variable. Accordingly, if the desired advance amount is zero, the ECU 17 carries out control so that the VVT control variable assumes zero, with the valve timing being set to the-maximum retardation side.

Next, a description will be made hereinbelow of a valve timing detecting device.

The sensor plate 12 and the sensor plate 14 are axially fixed on the crank shaft and the cam shaft, respectively. Projections are formed on outer circumferences of the sensor plates 12, 14.

Furthermore, in the vicinity of the sensor plates 12, 14, the crank angle sensor 13 and the cam angle sensor 15 are located facing the outer circumferences thereof, respectively. The crank angle sensor 13 and the cam angle sensor 15 detect as variations of magnetic fields, the variations in the distance between the crank angle sensor 13 and the sensor plate 12 and the variations in the distance between the cam angle sensor 15 and the sensor plate 14, occurring with rotation of the sensor plates 12, 14 respectively.

Thus, with the rotation of the crank shaft and the cam shaft, the sensor plates 12, 14 rotate, and the crank angle sensor 13 and the cam angle sensor 15 sense the projections on the outer circumferences thereof to thereby detect a crank angle and a cam angle, respectively.

FIG. 17 shows examples of output signals from a crank angle sensor and a cam angle sensor. FIG. 17 shows the characteristics of a four-cylinder internal combustion engine.

In an internal combustion engine with the characteristics shown in FIG. 17, the sensor plate 12 axially attached to the crank shaft has a projection between 76 degCA before top dead center (BTDC) and 6 degCA (BTDC) of crank angle. Thus, in such an internal combustion engine, a signal from the crank angle sensor 13 becomes high (H level) at BTDC 76 degCA, while it becomes low (L level) at BTDC 6 degCA.

Furthermore, In an internal combustion engine with the characteristics shown in FIG. 17, the sensor plate 14 set at its axis to the cam shaft has a projection formed to output an H level at a point (θ=20 degCA) 20 degCA prior to the switching of the output signal of the crank angle sensor 13 to the H level. Accordingly, in the maximum retardation value, a signal from the cam angle sensor 15 becomes an H level at a point (θ=20 degCA) 20 degCA prior to the switching of the output signal of the crank angle sensor 13 to the H level.

From the above, the ECU 17 calculates (obtains) the phase difference between the cam angle and crank angle, that is the advance amount, according to the following equation, on the basis of the time difference between signals from the crank angle sensor 13 and the cam angle sensor 15 and engine speed.

$$\theta = (T\text{crank} - T\text{cam})/(T\text{crank}[i] - T\text{crank}[i-1]) \times 180 \quad (1)$$

where,

θ: phase difference [degCA] between the cam shaft and the crank shaft;

Tcrank: a required time [msec] from when a free running counter starts until an output signal from the crank angle sensor switches to an H level; and Tcam: a required time [msec] from when the free running counter starts until an output signal from the cam angle sensor switches to an L level.

Moreover, Tcrank[i−1] signifies a value in the previous processing cycle with respect to Tcrank[i].

Since the signal input processing for the phase difference θ is conducted through interruption processing in a processing program of the ECU 17, even if the valve timing is on the maximum retardation side, the phase difference θ in FIG. 17 is made so as not to assume zero. This is because, if the phase difference θ becomes zero on the maximum retardation side, a miscalculation can take place at a minor timing in the interruption processing.

In order to prevent such erroneous calculation processing, a phase difference θ is also provided on the maximum retardation side of the valve timing and advance amount at this time is learned as the maximum retardation value. And then the advance control is carried out using this maximum retardation value as a reference.

Thus, the maximum retardation value is learned for the purpose of preventing irregularities in the maximum retardation value due to differences among the accuracies and installation positions of the sensor plates, the cam angle sensor and the crank angle sensor, and those arising from changes with the passage of time. That is, if the maximum retardation value is only stored in a ROM of the ECU 17 and is not actually detected, difficulty is experienced in accurately controlling the valve timing due to the aforesaid differences among the installation positions etc, and this hinders development of the intended performance of the internal combustion engine.

In addition, this maximum retardation value must be learned at a position where the valve overlap is at a minimum.

Regarding the idling condition of an internal combustion engine including the VVT mechanism, the stability of operating conditions is generally considered an important matter, and, through the use of oil pressure, the housing 21 is fixed relative to the rotor 22 at a position where the valve overlap is minimum.

However, in the case where the lubricating oil temperature in the internal combustion engine is increasing, the lubricating oil pressure drops in the idling condition, as compared with that in cold. Consequently, the force whereby the housing 21 is fixed at the position where the VVT control variable becomes zero decreases, and the position of the housing 21 with respect to the rotor 22 is varied by the force from the cam shaft so that there is a possibility of the valve timing advancing.

Accordingly, if the maximum retardation value is learned when the lubricating oil pressure is low, the maximum retardation value may contain errors.

Secondly, a description will be made hereinbelow of the operation of the conventional valve timing control system for an internal combustion engine.

FIG. 18 is a flow chart showing the processing contents of the conventional internal combustion engine valve timing control system.

As FIG. 18 shows, the processing starts at a step 1801 to calculate a phase difference between the cam shaft and the crank shaft on the basis of a rotational phase of the cam shaft detected by the cam angle sensor 15 and a rotational phase of the crank shaft detected by the crank angle sensor 13. The phase difference thus obtained signifies the present advance amount of the cam shaft with respect to the crank shaft.

Subsequently, a step 1802 follows to determine whether or not the operating condition of the internal combustion engine 1 is an idling condition.

If the internal combustion engine 1 is in the idling condition, the flow proceeds to a step 1803 to learn, as the maximum retardation value, an advance amount in the idling condition. Ordinarily, since the VVT mechanism does not operate in the idling condition, the maximum retardation value detected in the step 1803 becomes an advance amount when the valve timing is on the maximum retardation side.

Next, the flow proceeds to the step 1804 to calculate a deviation between the present advance amount detected in the step 1801 and the maximum retardation value learned in the step 1803. This deviation is a VVT control variable obtained by the valve timing system.

Moreover, in the idling condition, since the present advance amount is equal to the maximum retardation value learned in the step 1803, the VVT control variable assumes zero.

The ECU 17 determines a valve timing control variable on the basis of a deviation between the VVT control variable thus detected and a desired advance amount calculated in the ECU 17 in advance. Further, the ECU 17 controls the oil control valve 16 for driving the VVT actuator 20 so that the VVT control variable coincides with the desired advance amount.

As described above, in the-conventional valve timing control system for an internal combustion engine, the phase difference between the cam angle and the crank angle is learned in the idling state where the valve overlap becomes a minimum.

Nevertheless, in the idling condition, after the oil temperature rises, the oil pressure drops, and the force by which the housing 21 is fixed at the maximum retardation value with respect to the rotor 22 becomes weak so that there is a possibility that the housing 21 cannot be fixed at the maximum retardation value by the operating force of the cam shaft. This cam shaft operating force signifies a reactive force from a valve operating when a cam of the cam shaft activates the valve.

In such a case, since a position advanced a certain degree from the maximum retardation value is learned as the maximum retardation value, the valve timing control based upon the VVT control variable is implemented in a state where the erroneous maximum retardation value is used as a reference, thus creating an error between the valve timing control variable and the desired advance amount, making it difficult to develop the intended engine performance.

SUMMARY OF THE INVENTION

Accordingly, the present invention has been developed in order to eliminate such problems, and it is an object of this invention to provide a valve timing control system for an internal combustion engine, which is capable of controlling the valve timing with high accuracy by precisely learning the maximum retardation value.

For this purpose, in accordance with this invention, there is provided a valve timing control system for an internal combustion engine, comprising a crank angle detecting means for detecting a crank angle in the internal combustion engine, a cam angle detecting means for detecting a cam angle in the internal combustion engine, an advance amount calculating (computing) section for calculating an advance amount which is phase difference between the crank angle and the cam angle, a variable valve timing means for advancing and retarding the cam angle with respect to the crank angle through the use of lubricating oil pressure in the internal combustion engine, a learning means for learning the phase difference between the crank angle and the cam angle at a position where the variable valve timing means mechanically stops, and a valve timing control variable calculating means for calculating a valve timing control variable, for driving the variable valve timing means, on the basis of a deviation between the phase difference value learned by the learning means and the phase difference calculated by the advance amount calculating means, characterized in that the learning means learns the phase difference between the crank angle and the cam angle at the mechanically stopped position except when the internal combustion engine is in an idling condition. Thus, errors resulting from the operating force of the cam shaft are not included in the maximum retardation value, which ensures precise learning of the maximum retardation value. Consequently, high-precision valve timing control becomes possible.

Where the variable valve timing means is provided on the intake valve side of the internal combustion engine, when the variable valve timing means is at a mechanically stopped position and the valve timing is at the maximum retardation position, the learning means learns the phase difference between the crank angle and the cam angle on the intake valve side. Accordingly, it is possible to carry out the valve timing control precisely on the intake valve side.

Furthermore, where the variable valve timing means is provided on the exhaust valve side of the internal combustion engine, when the variable valve timing means is at a mechanically stopped position and the valve timing is at the maximum advance position, the learning means learns the phase difference between the crank angle and the cam angle on the exhaust valve side. Accordingly, it is possible to carry out the valve timing control precisely on the exhaust valve side.

The valve timing control system for an internal combustion engine further comprises a desired value calculating means for calculating a desired value of a deviation between the phase difference learned by the learning means and the phase difference calculated by the advance amount calculating means, with the learning means learning a phase difference between a crank angle and a cam angle when the desired value is zero. Accordingly, it is possible to calculate the maximum retardation value precisely in an operating condition where the lubricating oil pressure is high, thus accomplishing the valve timing control with high accuracy.

The valve timing control system for an internal combustion engine further comprises an operating condition determining means for determining an operating condition of the internal combustion engine, with the learning means learning the phase difference between crank angle and cam angle when the operating condition determining means determines the internal combustion engine is decelerating. Accordingly, it is possible to calculate the maximum retardation value precisely in an operating condition where the lubricating oil pressure is high, thus accomplishing the valve timing control with high accuracy.

The valve timing control system for an internal combustion engine further comprises an operating condition determining means for making a determination on an operating condition of the internal combustion engine, with the learning means learning the phase difference between the crank angle and the cam angle when the operating condition determining means determines that the internal combustion engine is under fuel shut-off control. Accordingly, it is possible to calculate the maximum retardation value precisely in an operating condition where the lubricating oil pressure is high, thus accomplishing the valve timing control with high accuracy.

The valve timing control system for an internal combustion engine further comprises an operating condition determining means for making a determination on an operating condition of the internal combustion engine, with the variable valve timing means being set to control the valve timing so that the valve overlap becomes a minimum when a speed of the internal combustion engine is higher than a predetermined value, and with the learning means learning a phase difference between a crank angle and a cam angle when the operating condition determining means determines that the engine speed is higher than the predetermined value. Accordingly, it is possible to calculate the maximum retardation value precisely in an operating condition where the lubricating oil pressure is high, thus accomplishing the valve timing control with high accuracy.

Furthermore, the learning means learns a phase difference between a crank angle and a cam angle after a predetermined period of time elapses from when the operating condition determining means determines that the desired value is zero, the internal combustion engine is decelerating, the internal combustion engine is under fuel shut-off control and a speed of the internal combustion engine is higher than the predetermined value. Accordingly, it is possible to calculate the maximum retardation value precisely in an operating condition where the lubricating oil pressure is high, thus accomplishing the valve timing control with high accuracy.

Moreover, the predetermined period of time is longer than a delay from when the operating condition determining means determines that the desired value is zero, the internal combustion engine is decelerating, the internal combustion engine is under fuel shut-off control or that a speed of the internal combustion engine is higher than the predetermined value until a valve timing control variable assumes zero. Accordingly, it is possible to calculate the maximum retardation value precisely in an operating condition where the lubricating oil pressure is high, thus accomplishing the valve timing control with high accuracy.

Furthermore, the learning means learns the phase difference between the crank angle and the cam angle when the internal combustion is cold. Accordingly, it is possible to calculate the maximum retardation value precisely in an operating condition where the lubricating oil pressure is high, thus accomplishing the valve timing control with high accuracy.

Still further, the learning means learns the phase difference between the crank angle and the cam angle when the speed of the internal combustion engine decreases to an ordinary idling speed from a condition of exceeding the idling speed immediately after starting. Accordingly, it is possible to calculate the maximum retardation value precisely in an operating condition where the lubricating oil pressure is high, thus accomplishing the valve timing control with high accuracy.

Moreover, the learning means learns the phase difference between the crank angle and the cam angle only when a learned value is not stored and retained. Accordingly, it is possible to calculate the maximum retardation value precisely in an operating condition where the lubricating oil pressure is high, thus accomplishing the valve timing control with high accuracy.

BRIEF DESCRIPTION OF THE DRAWINGS

The objects and features of-the present invention will become more readily apparent from the following detailed description of the preferred embodiments taken in conjunction with the accompanying drawings in which.

DETAILED DESCRIPTION OF THE INVENTION (First Embodiment)

Figure 1:
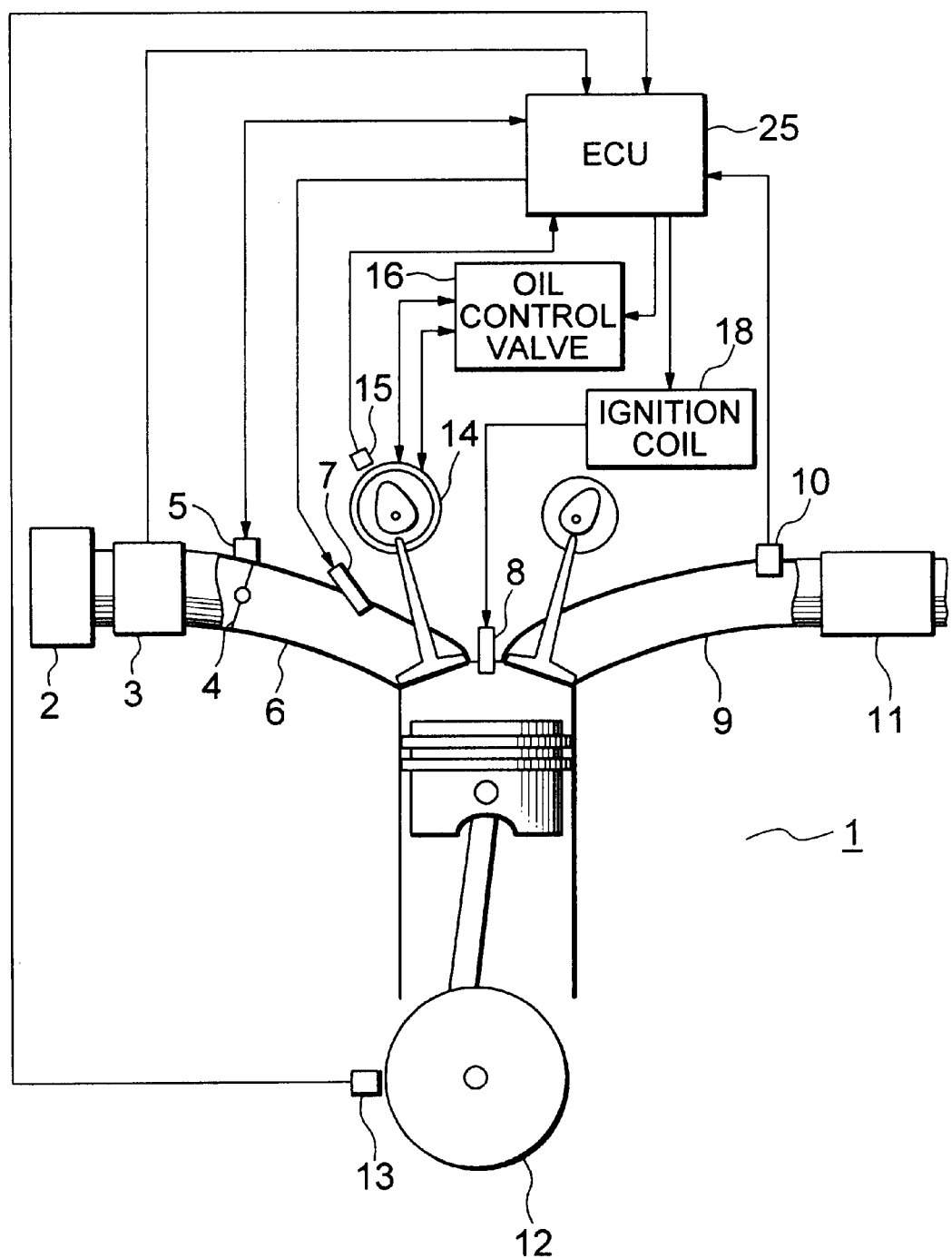
FIG. 1 is an illustration of a configuration of a valve timing control system for an internal combustion engine according to a first embodiment of this invention.

FIG. 1 is an illustration of a configuration of a valve timing control system for an internal combustion engine according to a first embodiment of the present invention.

In FIG. 1, parts corresponding to those of the conventional valve timing control system for an internal combustion engine are marked with the same numerals, and the description thereof will be omitted for brevity.

A crank angle sensor 13 serves as a crank angle detecting means and a cam angle sensor 15 acts as a cam angle detecting means. An ECU 25 functions as an advance amount calculating means, a learning means, a valve timing control variable calculating means and an operating condition determining means. A VVT actuator 20 functions as a variable valve timing means.

An air cleaner 2 is installed at an opening of an intake pipe 6 to clean the air an internal combustion engine 1 intakes. An air flow sensor 3 is installed on the downstream side of the air cleaner 2 to sense the intake amount into the internal combustion engine 1. A throttle valve 4 is opened and closed in connection with the accelerator pedal to adjust the air intake amount. A throttle sensor 5 detects the opening degree of the throttle valve 4.

In such an internal combustion engine, when the driver steps on the accelerator pedal, the throttle valve 4 opens/ closes, and air is mixed with a fuel injected from the injector 7 and this air-fuel mixture is introduced into cylinders. The fuel-air mixture is then ignited by an ignition plug to push the pistons downwardly by the combustion thereof, thereby causing a crank shaft to rotate. The rotation of the crank shaft is derived as the output of the internal combustion engine.

With this operation of the internal combustion engine, an $O_2$ sensor 10 detects the residual oxygen amount in the exhaust gas. A catalytic converter 11 simultaneously removes THC, CO and NOx which are harmful gases contained in the exhaust gas.

Figure 2:
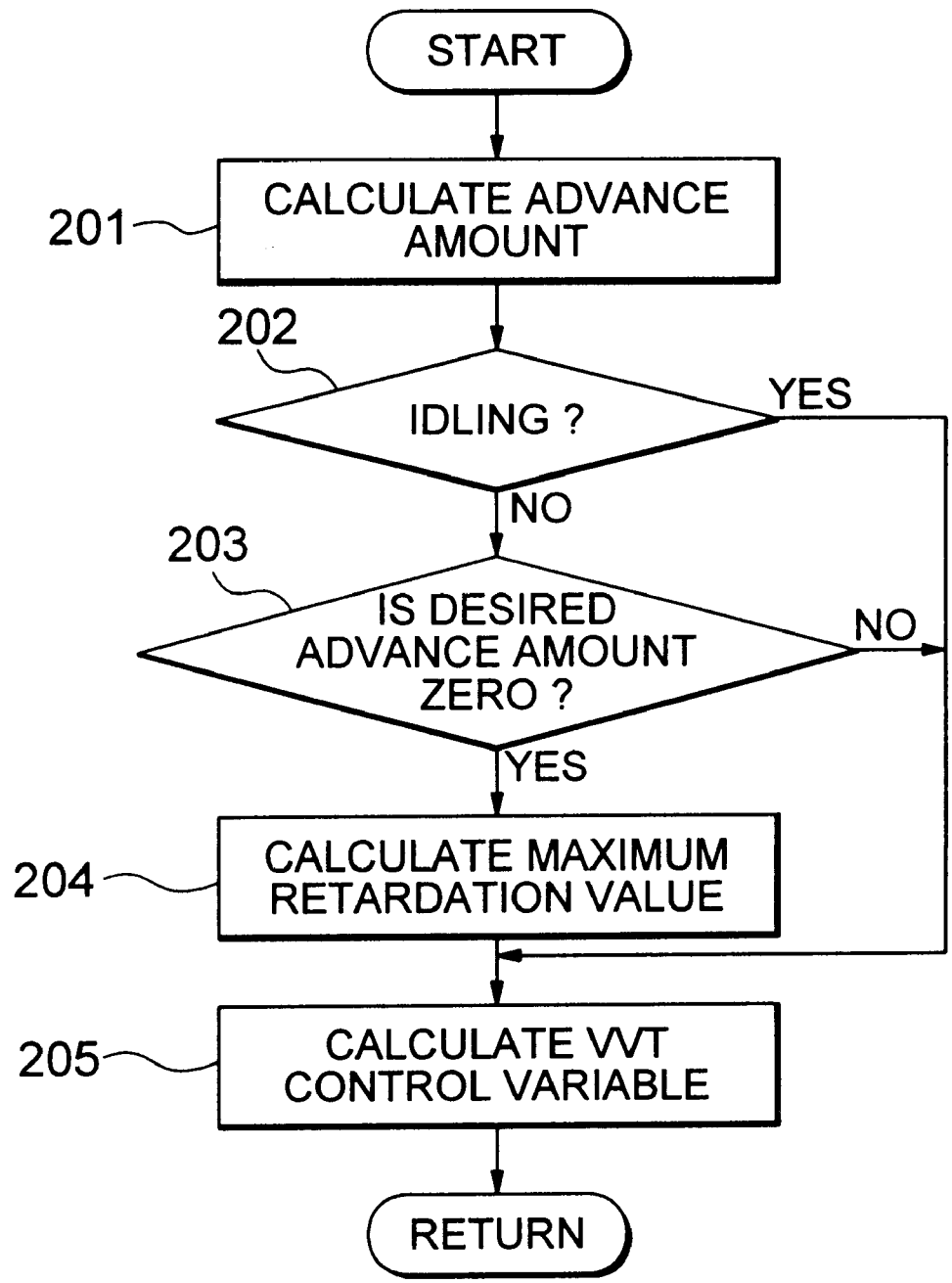
FIG. 2 is a flow chart showing the contents of control processing in the internal combustion engine valve timing control system according to the first embodiment of this invention.

FIG. 2 is a flow chart showing the contents of control processing in the internal combustion engine valve timing control system according to the first embodiment of this invention.

As FIG. 2 shows, processing starts at the step 201 in which the ECU 25 calculates the present advance amount which is the phase difference between signals from the cam angle sensor 15 and the crank angle sensor 13.

In the step 202, it is determined whether or not the internal combustion engine 1 is an idling condition. This determination is made on the basis of whether or not the throttle sensor 5 senses the fully closed position, whether the engine speed assumes an idling speed, or whether the internal combustion engine 1 is under idling speed control.

If the ECU 25 determines that the internal combustion engine 1 is not in an idling condition, a step 203 follows to determine whether or not the desired advance amount is zero. If the desired advance amount is zero, the flow proceeds to a step 204 in which the ECU 25 learns the advance amount at that time as the maximum retardation value.

Thus, when the internal combustion engine 1 is not in the idling condition and the desired advance amount is zero, the valve timing is at the maximum retardation position which is the mechanically stopped position of the VVT actuator 20 on the retardation side. Further, in engine operating conditions other than starting, the engine speed becomes the lowest during idling, while in conditions other than the idling condition, the engine speed becomes higher during idling so that the oil pressure rises. Consequently, the force by which the housing 21 is fixed to the rotor 22 becomes stronger, so that, unlike the conventional system, the maximum retardation value learned in the step 204 does not contain errors.

Next, the flow proceeds to a step 205 where the ECU 25 calculates a VVT control variable on the basis of the present phase difference calculated in the step 201 and the maximum retardation value learned in the step 204.

On the other hand, if in step 202 the ECU 25 determines the idling condition, or if in the step 203 it decides that the desired advance amount is not zero, the flow proceeds to the step 205 in which the ECU 25 calculates the VVT control variable. In the case of such processing, the learning of the maximum retardation value is not performed and the VVT control variable is calculated using the learned maximum retardation values used in the processing in the previous cycles. That is, for instance, the maximum retardation value is not learned immediately after the start of the internal combustion engine 1, but is calculated using design values or the like stored and retained in a ROM of the ECU 25 if a maximum retardation value is not stored and retained in a RAM of the ECU 25 or the like.

Thus, when the flow proceeds through steps 201, 202 and 203 to the step 204 for learning the maximum retardation value, the VVT control variable to be calculated in the next step 205 assumes zero. This is because errors are not included in the maximum retardation value and the present advance amount is equal to the maximum retardation value.

On the other hand, if the flow reaches the step 205 through the step 202 or 203 without passing through the step 204, the maximum retardation value stored and retained in the RAM of the ECU 25 differs from the present advance amount, and the deviation calculated in the step 205 becomes the VVT control variable.

As described above, with the valve timing control system for an internal combustion engine according to the first embodiment of this invention, when the internal combustion engine 1 is in a condition other than the idling condition, in which the lubricating oil pressure is high, and the desired advance amount assumes zero, the maximum retardation value is learned. Accordingly, errors caused by the operating force of the cam shaft are not included in the maximum retardation value, which enables the precise learning of the maximum retardation value. Consequently, highly accurate valve timing control can be performed.

(Second Embodiment)

Figure 3:
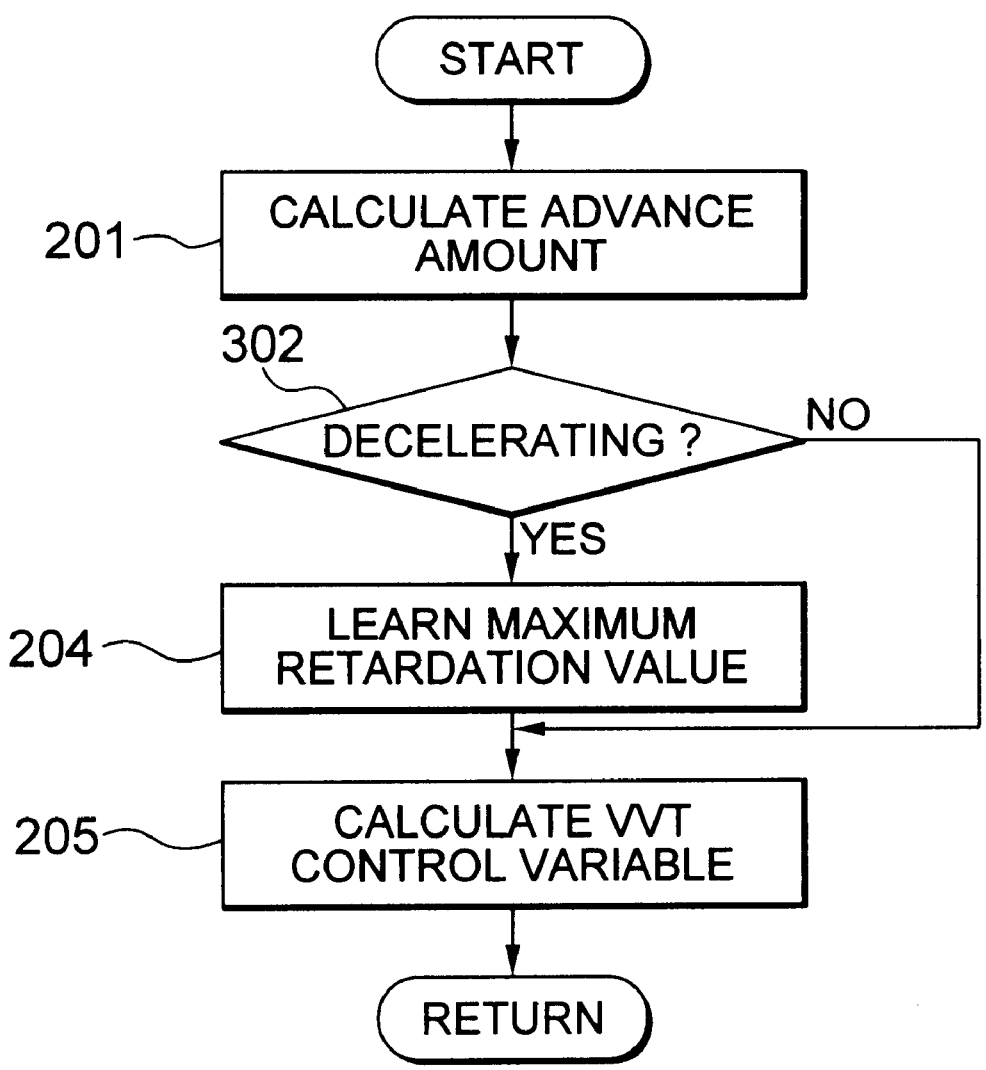
FIG. 3 is a flow chart showing the contents of control processing in a valve timing control system for an internal combustion engine according to a second embodiment of this invention.

FIG. 3 is a flow chart showing the contents of control processing in a valve timing control system for an internal combustion engine according to a second embodiment of this invention.

In FIG. 3, the contents of steps 201, 204 and 205 are identical to those of steps marked with the same numerals, and the repeat description thereof will be omitted.

In addition, configuration of the valve timing control system for an internal combustion engine according to the second embodiment is similar to that of the first embodiment shown in FIG. 1. The steps 201, 302, 204 and 205, which will be described hereinbelow, are implemented in the ECU 25.

In FIG. 3, the ECU 25 calculates an advance amount in the step 201 and then, in the step 302, determines whether or not the internal combustion engine is decelerating. If the determination shows that the internal combustion engine is decelerating, the ECU 25 learns a maximum retardation value in the step 204. Further, the ECU 25 calculates a VVT control variable in the step 205.

On the other hand, if the internal combustion engine is not decreasing, the flow proceeds to the step 205 to calculate the VVT control variable on the basis of the maximum retardation values learned in the previous cycles.

In the step 302, the ECU 25 determines that the internal combustion engine is decelerating, on the basis of, for example, the fact that the engine speed is high when an output value of the throttle sensor indicates a fully closed condition, or that the engine speed is higher than a predetermined speed or the idling speed.

Figure 4:
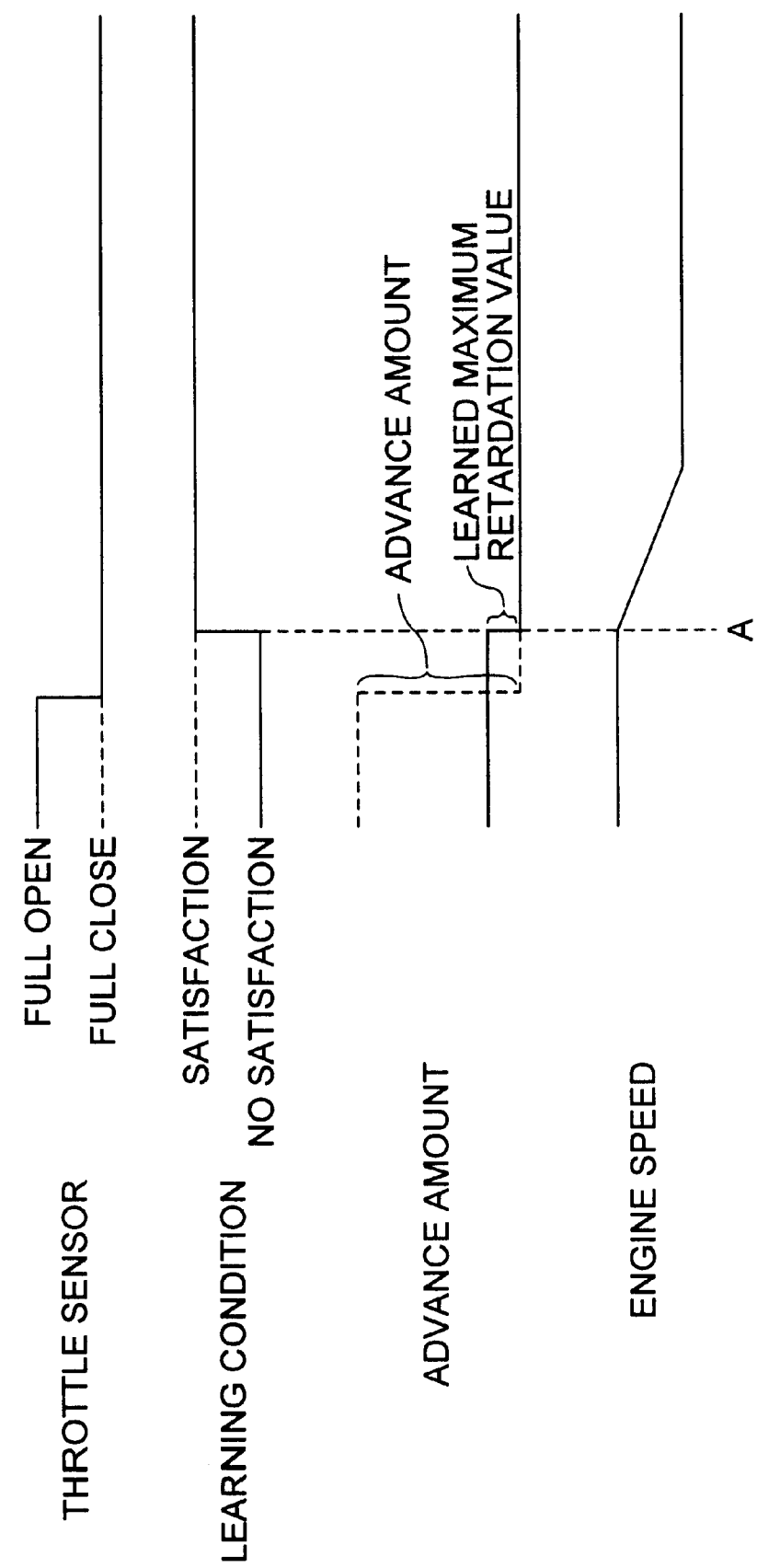
FIG. 4 is a timing chart showing the processing contents in the internal combustion engine valve timing control system according to the second embodiment of this invention.

FIG. 4 is a timing chart showing the processing contents in the internal combustion engine valve timing system according to the second embodiment of this invention.

The timing chart of FIG. 4 corresponds to the control processing in FIG. 3, showing the case that the maximum retardation value is learned when the internal combustion engine is in the decelerating.

As FIG. 4 shows, in order to effectively exhibit the effects of engine braking when the internal combustion engine is decelerating, control to the maximum retardation side where the valve overlap becomes a minimum is implemented to maximize the pumping loss. Accordingly, at this time, the desired advance amount is set at zero. Further, a desired advance amount in a deceleration region in a two-dimensional map can also be set at zero.

When the throttle valve 4 becomes fully closed, the output of the throttle sensor becomes a value indicative of the fully closed condition, and the internal combustion engine begins to decelerate so that the engine speed starts to drop.

At a point of time A in FIG. 4, the desired advance amount in the internal combustion engine becomes zero, and although the engine speed is high, the motor vehicle is decelerating. At this time, the condition of learning the maximum retardation value is satisfied, so that the advance amount at this time is learned as the maximum retardation value.

As described above, according to the second embodiment of this invention, in a state where the internal combustion engine is decelerating and the engine speed is higher than the idling speed, the maximum retardation value is learned when the valve timing is at the maximum retardation position. As a result, precise learning of the maximum retardation value is possible in a state where the lubricating oil pressure in the combustion engine is high, which prevents errors from being included in the maximum retardation value due to the operating force of the cam shaft. Accordingly, the valve timing of the internal combustion engine can be controlled with a high degree of accuracy.

(Third Embodiment)

Figure 5:
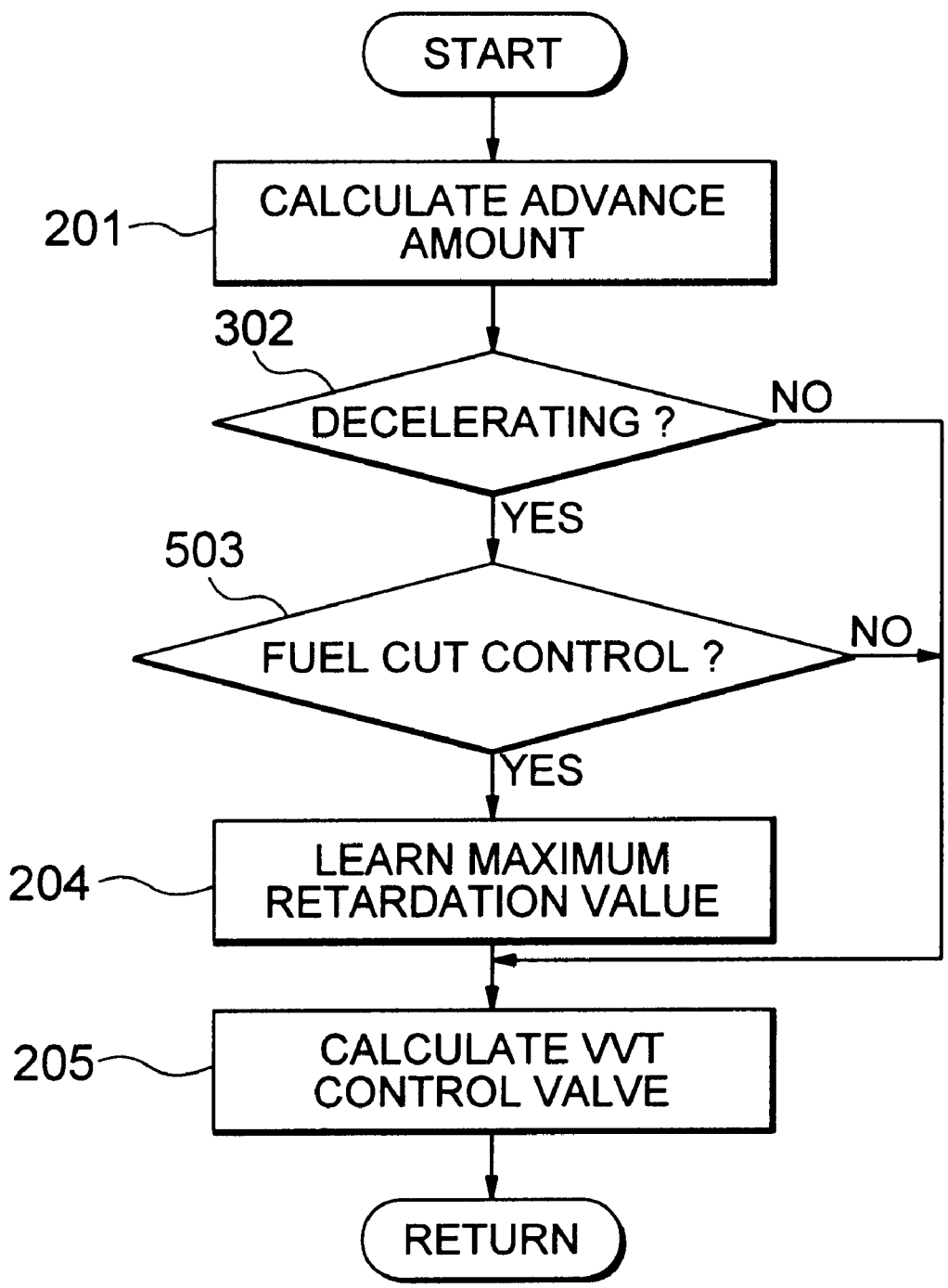
FIG. 5 is a flow chart showing the contents of control processing in a valve timing control system for an internal combustion engine according to a third embodiment of this invention.

FIG. 5 is a flow chart showing the contents of control processing in a valve timing control system for an internal combustion engine according to a third embodiment of this invention.

In FIG. 5, the contents of steps 201, 302, 204 and 205 are the same as those in the first and second embodiments, marked with the same numerals and the repeat description thereof will be omitted.

Configuration of the internal combustion engine valve timing control system according to the third embodiment is similar to that of the internal combustion engine valve timing control system according to the first embodiment shown in FIG. 1. The steps 201, 302, 503, 204 and 205, which will be described hereinbelow, are implemented by the ECU 25.

When the ECU 25 determines in the step 302, that the internal combustion engine is decelerating then the flow proceeds to the step 503 where it determines whether or not fuel cut control.

The "fuel cut control" at the deceleration of the internal combustion engine signifies fuel non-injection control for the purpose of the reduction of fuel consumption and exhaust gas.

If in the step 503 the ECU 25 determines not to implement fuel cut control, the flow proceeds directly to the step 205.

On the other hand, if in the step 503 the ECU 25 determines to implement the fuel cut control, the ECU 25 learns the maximum retardation value in the step 204. Thereafter, the flow further proceeds to the step 205.

Figure 6:
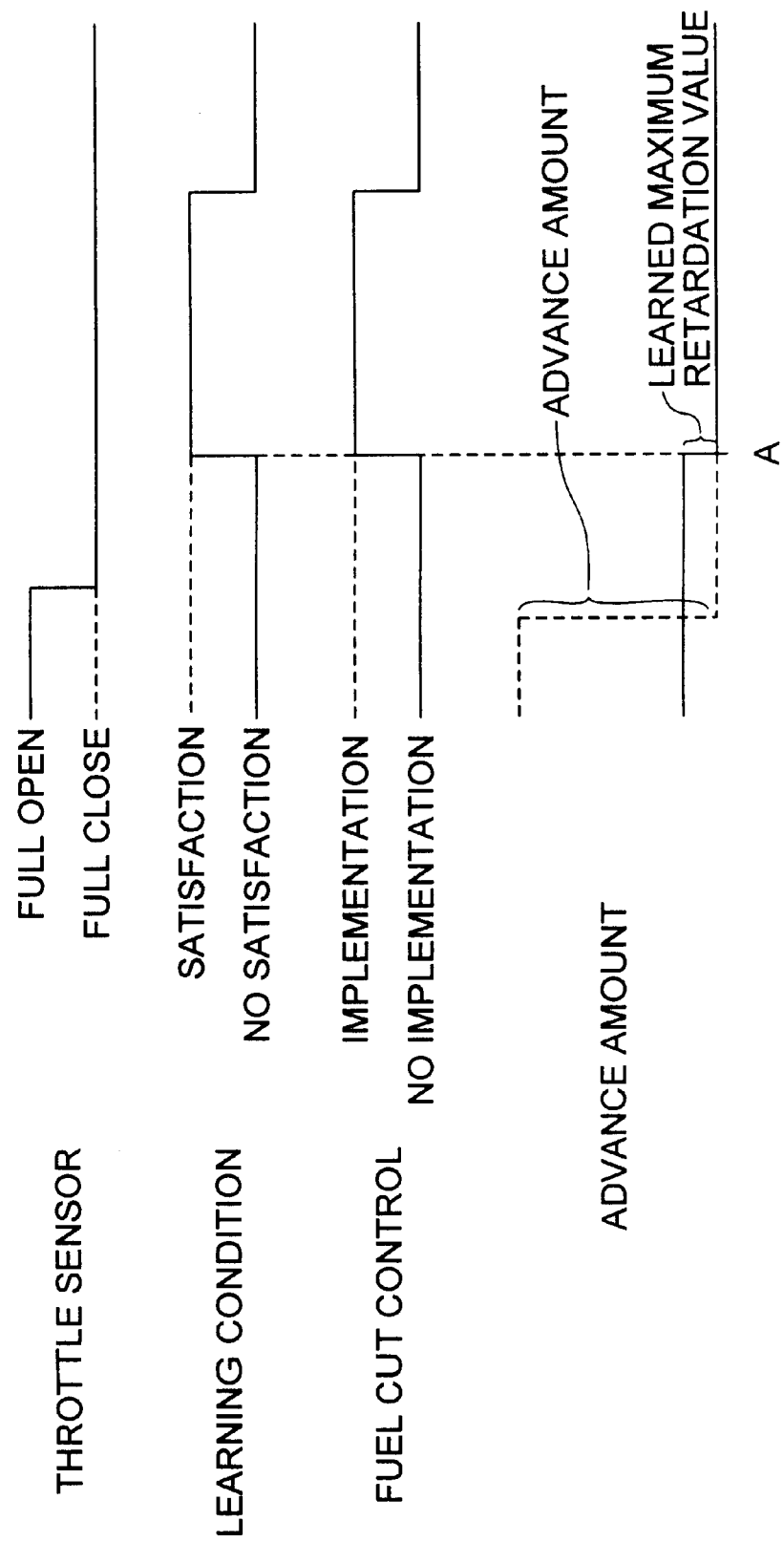
FIG. 6 is a timing chart showing the processing contents in the internal combustion engine valve timing control system according to the third embodiment of this invention.

FIG. 6 is a timing chart showing the processing contents in the internal combustion engine valve timing control system according to the third embodiment of this invention.

As shown in FIG. 6, in order to learn the maximum retardation value during the execution of the fuel cut control, the output signal of the throttle sensor indicates the fully-closed value, and the advance amount at a point of time A where the fuel cut control begins is stored and retained as a learned maximum retardation value. At the point A, the condition of learning the maximum retardation value is satisfied, and the advance amount at this time is learned as the maximum retardation value.

As described above, according to the third embodiment of this invention, since the maximum retardation value is learned when the internal combustion engine is under the fuel cut control while decelerating and the valve timing is at the maximum retardation, it is possible to learn the maximum retardation value in a state where the lubricating oil pressure in the internal combustion engine is high. Accordingly, the valve timing does not vary from the maximum retardation position due to the operating force of the cam shaft but becomes stable, with the result that high-precision valve timing control becomes possible.

In addition, in order to prevent the internal combustion engine from stalling, the fuel cut control during decelerating is implemented only in a state where the engine speed is somewhat high. Thus, when the fuel cut control is done, the lubricating oil pressure is somewhat high. Further, since combustion does not take place during the fuel cut control, adverse influences of combustion do not arise.

From the above, with the internal combustion engine valve timing control system according to the third embodiment of this invention, it is possible to learn the maximum retardation position with high accuracy, thus achieving more accurate valve timing control.

(Fourth Embodiment)

Figure 7:
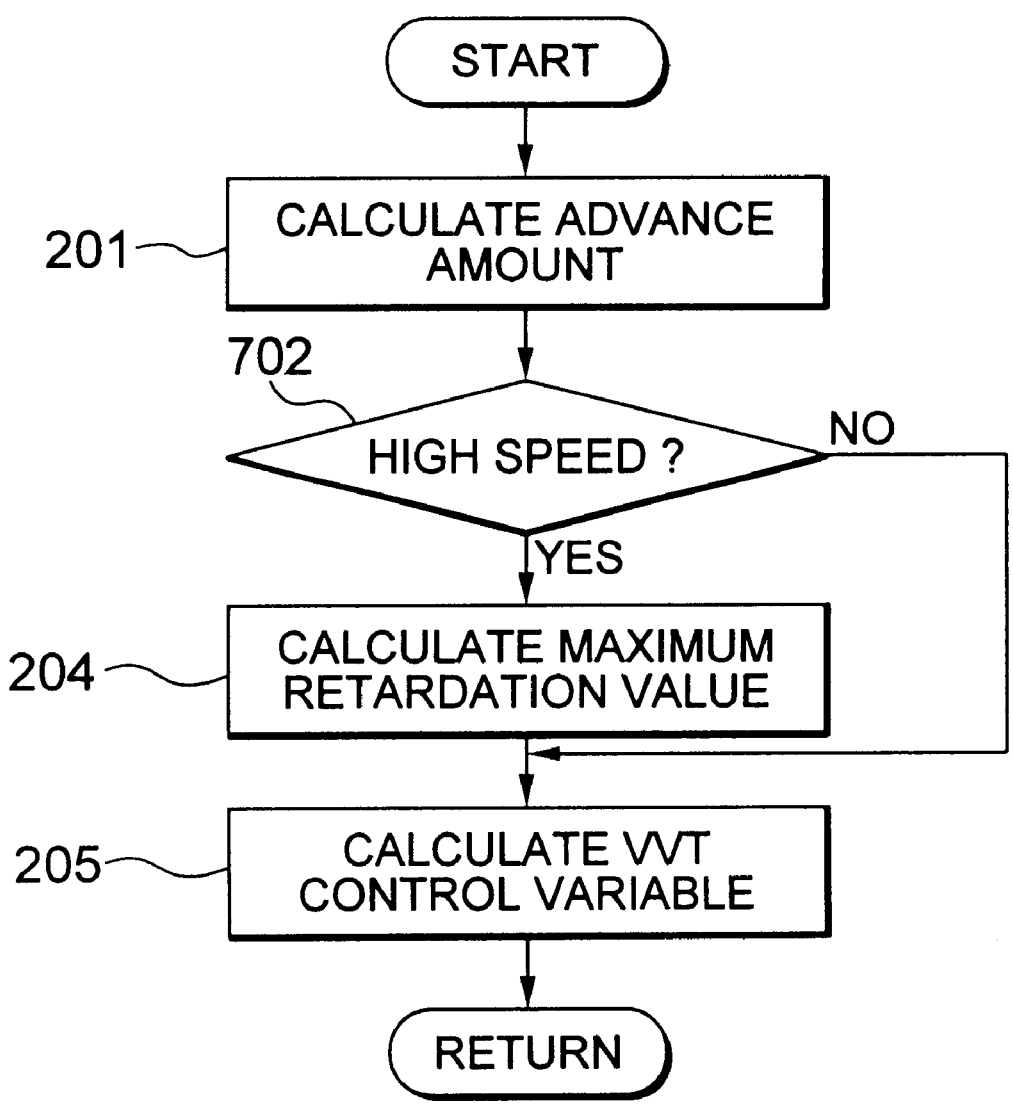
FIG. 7 is a flow chart showing the processing contents in a valve timing control system for an internal combustion engine according to a fourth embodiment of this invention.

FIG. 7 is a flow chart showing the processing contents in a valve timing control system for an internal combustion engine according to a fourth embodiment of this invention.

In FIG. 7, the contents of steps 201, 204 and 205 are identical to those in the first embodiment marked with the same numerals, and the description thereof will be omitted for brevity.

Furthermore, a configuration of the internal combustion engine valve timing control system according to the fourth embodiment is similar to that of the internal combustion engine valve timing control system according to the first embodiment shown in FIG. 1. The steps 201, 702, 204 and 205 are implemented by the ECU 25.

The fourth embodiment of this invention describes the case in which a valve timing control system according to the invention is applied, particularly, to an internal combustion engine including a VVT mechanism which advances the valve timing in a medium engine speed region and sets the valve timing on the maximum retardation side in a high engine speed region.

The ECU 25, after calculating an advance amount in the step 201, decides, in the step 702, whether or not the speed of the internal combustion engine is in a high engine speed region.

If the engine speed is in the high engine speed region, the ECU 25 learns the maximum retardation value in the step 204, and subsequently calculates the VVT control variable in the step 205.

On the other hand, if the engine speed is not in the high engine speed region, the flow proceeds to the step 205 to calculate the VVT control variable on the basis of the maximum retardation values learned in the calculating processing in the previous cycles.

In this case, the "high engine speed region" means a state where, for example, the engine speed exceeds 5000 rpm, and in the above-mentioned internal combustion engine, since the engine output is improved in the high engine speed region by using an intake inertia supercharging effect, the valve timing is controlled to the maximum retardation side.

Further, the advance amount at this time is learned as the maximum retardation value.

Moreover, such valve timing control is accomplished, for example, setting the desired advance amount in the high engine speed region in a two-dimensional map at zero.

As described above, according to the fourth embodiment of this invention, since the maximum retardation value is learned when the internal combustion engine is in the high engine speed region and the desired advance angle assumes zero, it is possible to learn the maximum retardation value when the lubricating oil pressure in the internal combustion engine is high. Moreover, the valve timing is made stable by not varying from the maximum retardation value due to the operating force from the cam shaft, so that high-precision valve timing control is possible.

(Fifth Embodiment)

According to a fifth embodiment of this invention, when the valve timing is retarded to come to the maximum retardation position, control is performed wherein a delay is provided before learning the maximum retardation value.

Figure 8:
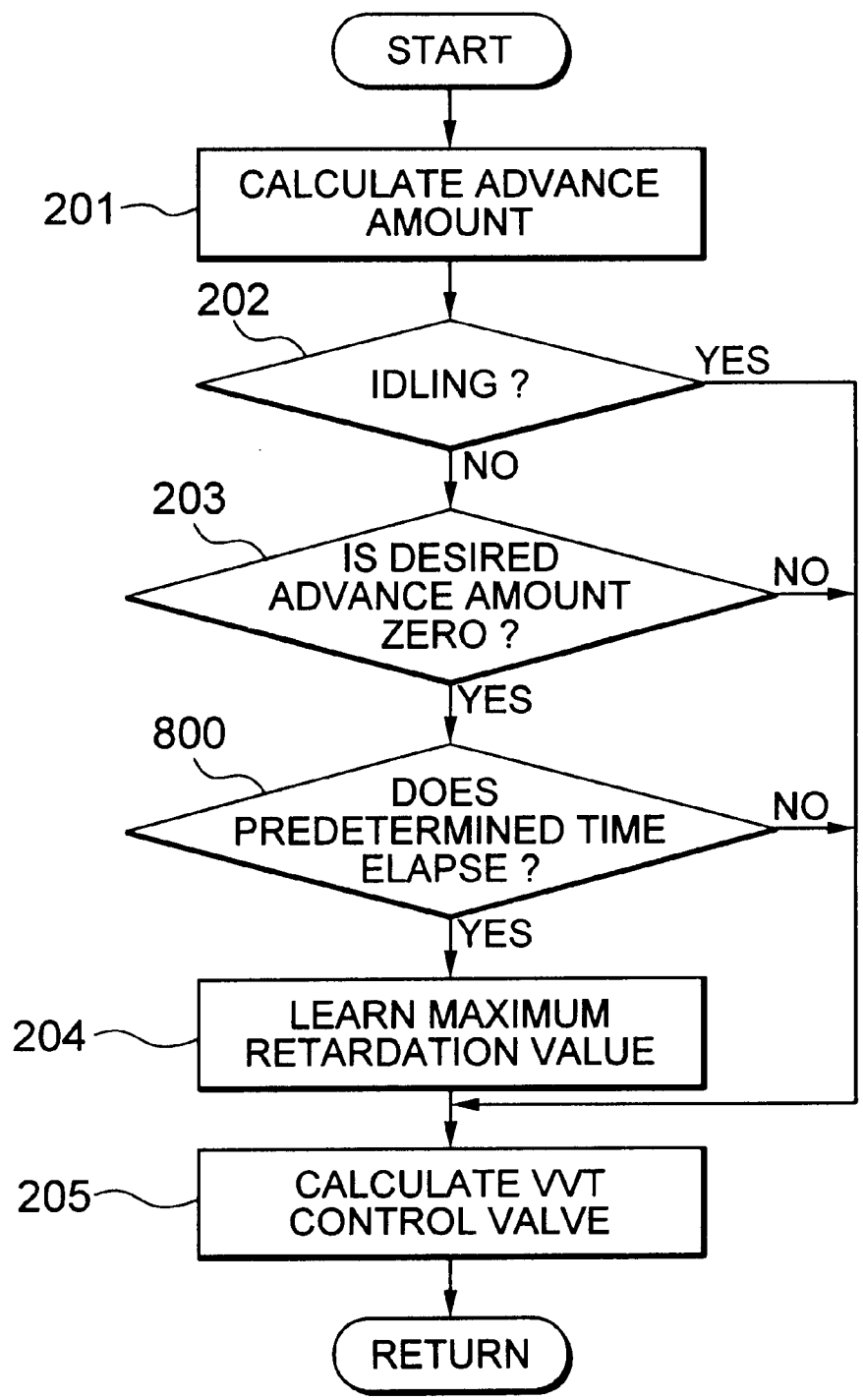
FIG. 8 is a flow chart showing the processing contents in a valve timing control system for an internal combustion engine according to a fifth embodiment of this invention.

FIG. 8 is a flow chart showing the processing contents in a valve timing control system for an internal combustion engine according to the fifth embodiment of this invention.

In FIG. 8, the contents of steps 201 to 205 are identical to those in the first embodiment marked with the same numerals, and the repeat description thereof will be omitted.

Further, a configuration of the internal combustion engine valve timing control system according to the fifth embodiment is similar to that of the internal combustion engine valve timing control system according to the first embodiment shown in FIG. 1. The steps 201 to 205 and a step 800 are implemented by the ECU 25.

The flow proceeds through steps 201 and 202, and then reaches the step 203, and when a determination is made in the step 203 that the desired advance amount is zero, the ECU 25 determines, in the step 800, whether or not a predetermined period of time has elapsed after the desired advance amount becomes zero.

If the predetermined period of time has not elapsed, the flow proceeds to the step 205 without learning the maximum retardation value, and the VVT control variable is calculated on the basis of the maximum retardation values learned in the operational processing in the previous cycles.

On the other hand, if the determination shows that the predetermined period of time has elapsed, the flow proceeds to the step 204 to learn the maximum retardation value. After the learning of the maximum retardation value in the step 204, the flow proceeds to the step 205 to calculate the VVT control variable on the basis of the maximum retardation value learned in the step 204.

In a valve timing control system of an internal combustion engine, since the engine lubricating oil pressure is used as a power source to conduct the feedback control for the VVT control variable, the VVT control variable to follow after the desired advance amount.

Accordingly, the predetermined period of time in the step 800 must be longer than the delay time from when the desired advance amount becomes zero until the VVT control variable becomes zero.

The time from when the desired advance amount becomes zero until the VVT control variable becomes zero depends upon the lubricating oil pressure which varies with the engine speed, and as the engine speed becomes higher, it becomes shorter. Accordingly, it is also appropriate that the predetermined period of time is set to be long when the engine speed is low while it is set to be short when the engine speed is high.

Although the above description relates to the case of using a predetermined period of time, the present invention is not limited thereto. Therefore, it is also possible to carry out the valve timing control by determining, in the step 800, whether a predetermined period of time, such as a predetermined number of times of ignition, a predetermined crank angle or a predetermined integrated value of the engine speed, has elapsed or not.

In the case of using the predetermined engine speed value or the like in the step 800, when the engine speed is high, the time until the predetermined value is reached becomes short, while, when the engine speed is low, the time until the predetermined value is reached becomes long. Accordingly, this can offer the same effects as when the predetermined period of time in the step 800 is set to be longer than the delay time from when the desired advance amount becomes zero until the VVT control variable reaches zero.

Although the description of the fifth embodiment of this invention has been made for the case where the control based on the aforesaid delay is loaded in the invention described in the first embodiment, it is similarly applicable to the inventions described in the second to fourth embodiments.

That is, in the case of the second embodiment, a determination the step equivalent to the aforesaid the step 800 is put between steps 302 and 204 in FIG. 3.

Furthermore, in the case of the third embodiment, a determination the step equivalent to the aforesaid the step 800 is put between steps 503 and 204 in FIG. 5.

Still further, for the fourth embodiment, a determination the step equivalent to the aforesaid the step 800 is put between steps 702 and 204 in FIG. 7.

As described above, with the internal combustion engine valve timing control system according to the fifth embodiment of this invention, when the valve timing varies from a condition in which the advance takes place somewhat the maximum retardation position, the maximum retardation angle is learned after the elapse of a predetermined delay time. Thus, it is possible to eliminate the possibility that the learning will be made with an error included in the maximum retardation value because the calculation processing for the VVT control variable cannot follow the calculation processing for the maximum retardation value.

(Sixth Embodiment)

Figure 9:
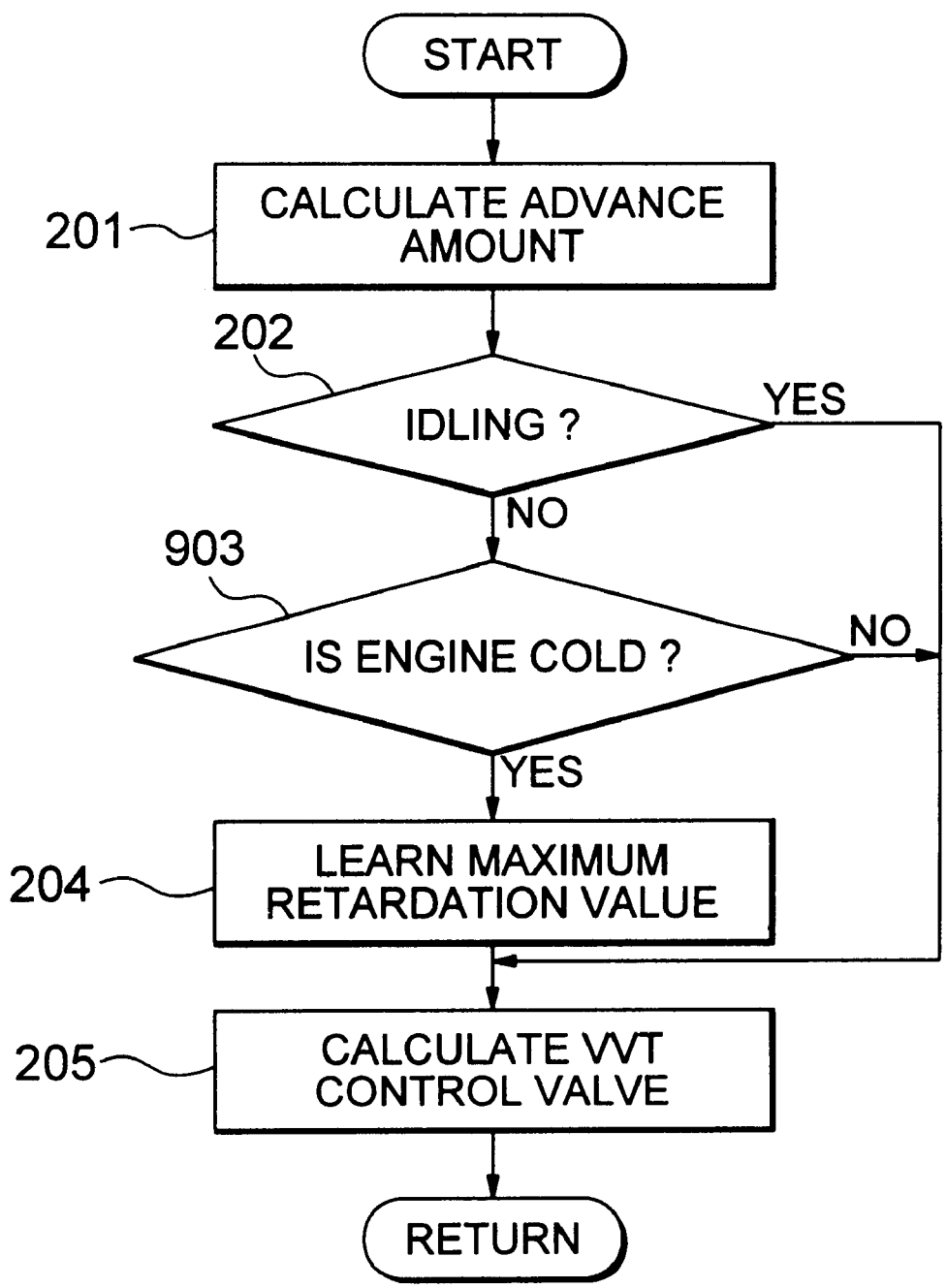
FIG. 9 is a flow chart showing the processing contents in a valve timing control system for an internal combustion engine according to a sixth embodiment of this invention.

FIG. 9 is a flow chart showing the processing contents in a valve timing control system for an internal combustion engine according to a sixth embodiment of this invention.

In FIG. 9, the processing contents of steps 201 to 205 are identical to those in the second embodiment marked with the same numerals, and the repeat description thereof will be omitted.

A configuration of the internal combustion engine valve timing control system according to the sixth embodiment is similar to that of the internal combustion engine valve timing control system according to the first embodiment shown in FIG. 1. The steps 201, 202, 903, 204 and 205, which will be described hereinbelow, are implemented by the ECU 25.

The flow passes through steps 201 and 202 and reaches the step 903 where a determination is made as to whether the internal combustion engine is cold or not.

When the determination of the step 903 indicates that the internal combustion engine is cold, the ECU 25 learns the maximum retardation value in the step 204. Further, the flow proceeds to the step 205 to calculate the VVT control variable on the basis of the maximum retardation value learned in the step 204.

On the other hand, if the internal combustion engine is not cold, that is, that warming-up has been completed, the flow proceeds to the step 205 to calculate the VVT control variable on the basis of the maximum retardation values learned in the operational processing in the previous cycles.

For instance, the determination of the step 903 as to whether the internal combustion engine is cold or not can be made by checking whether the cooling water temperature is above or below 70° C. In this case, if the cooling water temperature is below 70° C., it is determined that internal combustion engine is cold.

In general, the combustion temperature is low when the internal combustion engine is cold, and the combustion temperature further drops because of an increase in the EGR amount if the advance control is performed, thereby leading to an unstable combustion state. For this reason, the advance control is not carried out. Therefore, the advance amount when it is determined that the internal combustion engine is cold is learned as the maximum retardation value.

Meanwhile, in general, when the internal combustion engine is cold, in order to warm up the internal combustion engine early, or in order to stabilize the combustion condition, the engine speed is set to be higher than when the engine is warm. Further, the temperature of the lubricating oil is low when the internal combustion engine is cold, and the lubricating oil pressure increases relative thereto.

Thus, when the lubricating oil pressure is high, the valve timing does not vary from the maximum retardation position due to the operating force of the cam shaft, and the maximum retardation value learned in the step 204 does not include errors, so that precise valve timing control is possible.

(Seventh Embodiment)

Figure 10:
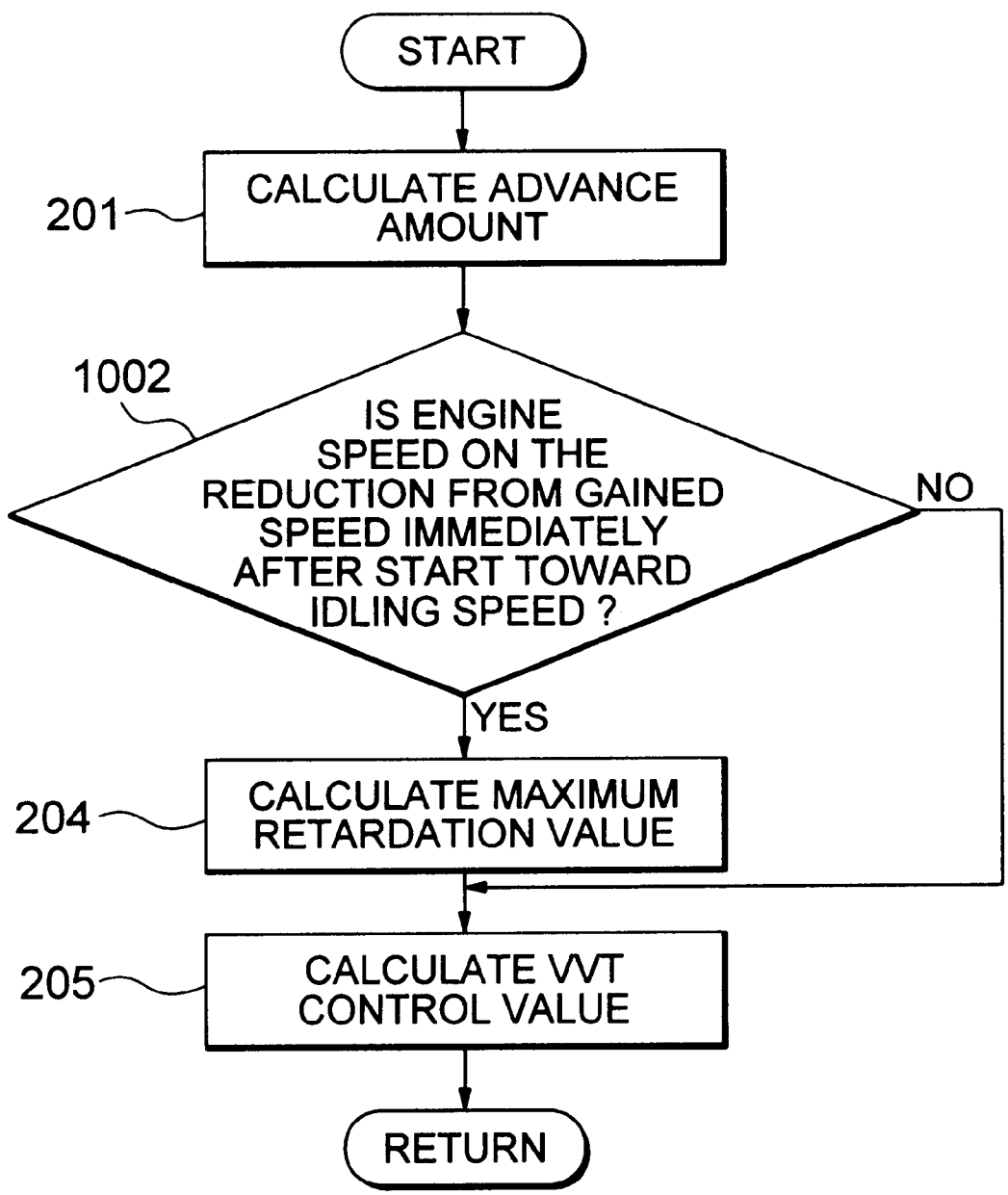
FIG. 10 is a flow chart showing the processing contents in a valve timing control system for an internal combustion engine according to a seventh embodiment of this invention.

FIG. 10 is a flow chart showing the processing contents in a valve timing control system for an internal combustion engine according to a seventh embodiment of this invention.

In FIG. 10, the processing-contents of steps 201, 204 and 205 are identical to those in the first embodiment marked with the same numerals, and the repeat description thereof will be omitted.

A configuration of the internal combustion engine valve timing control system according to the seventh embodiment is similar to that of the first embodiment. The steps 201, 1002, 204 and 205, which will be described hereinbelow, are implemented by the ECU 25.

The ECU 25, after calculating an advance amount in the step 201, proceeds to the step 1002 to determine whether or not control is carried out to lower the speed of the internal combustion engine to a normal idling speed from a speed set to be higher than the idling speed immediately after the start of the engine.

If step 1002 determines implementation of this control, the flow proceeds to the step 204 to learn a maximum retardation value, and further proceeds to the step 205 to calculate a VVT control variable on the basis of the maximum retardation value learned in the step 204.

On the other hand, if the answer of the step 1002 indicates the aforesaid control has not been implemented, the flow proceeds to the step 205 to calculate the VVT control variable on the basis of the maximum retardation values learned in the operational processing in the previous cycles.

Figure 11:
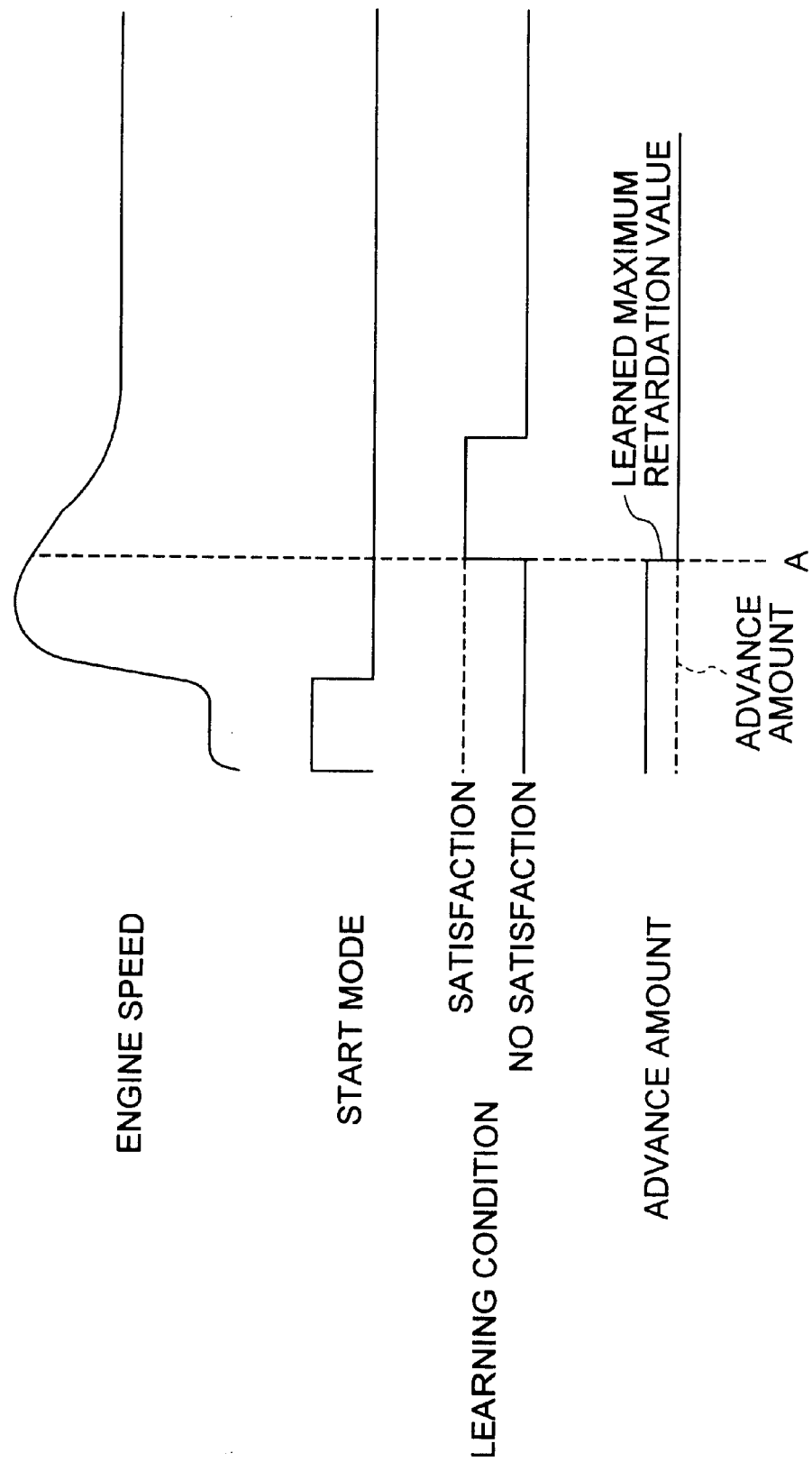
FIG. 11 is a timing chart showing the processing contents in the internal combustion engine valve timing control system according to the seventh embodiment of this invention.

FIG. 11 is a timing chart showing the processing contents in the internal combustion engine valve timing control system according to the seventh embodiment of this invention.

A determination as to whether a start mode is set or not is made according to information such as a starter signal indicating that the starter is in the turned-on state, the engine speed and the like. It is determined that the start mode is set at the start of the internal combustion engine.

If the determination indicates the start mode is determined, the ECU 25 increases the opening degree of the ISC (Idle Speed Control) valve (not shown) for starting the internal combustion engine to increase the fuel injection amount, thus implementing the control for the start of the internal combustion engine.

When the engine speed increases and the starter is turned off after the start of the internal combustion engine, the start mode becomes an end, and the ISC valve and the fuel control are switched to their normal manners. Further, after the engine speed increases to be higher than the idling speed by the control in the start mode, the engine speed reduces to converge to the idling speed.

As FIG. 11 shows, for example, the learning condition of the maximum retardation value is satisfied at a point of time A at that the engine speed begins to drop, and the advance amount at that time is learned as a learned value.

As described above, according to the seventh embodiment of this invention, the maximum retardation value is learned when the engine speed rises immediately after the start thereof. In this way, since the learning of the maximum retardation value is made in a state where the valve timing is at the maximum retardation position, the learned maximum retardation value does not include an error from the operating force of the cam shaft; in consequence, high-precision valve timing control becomes feasible.

(Eighth Embodiment)

Figure 12:
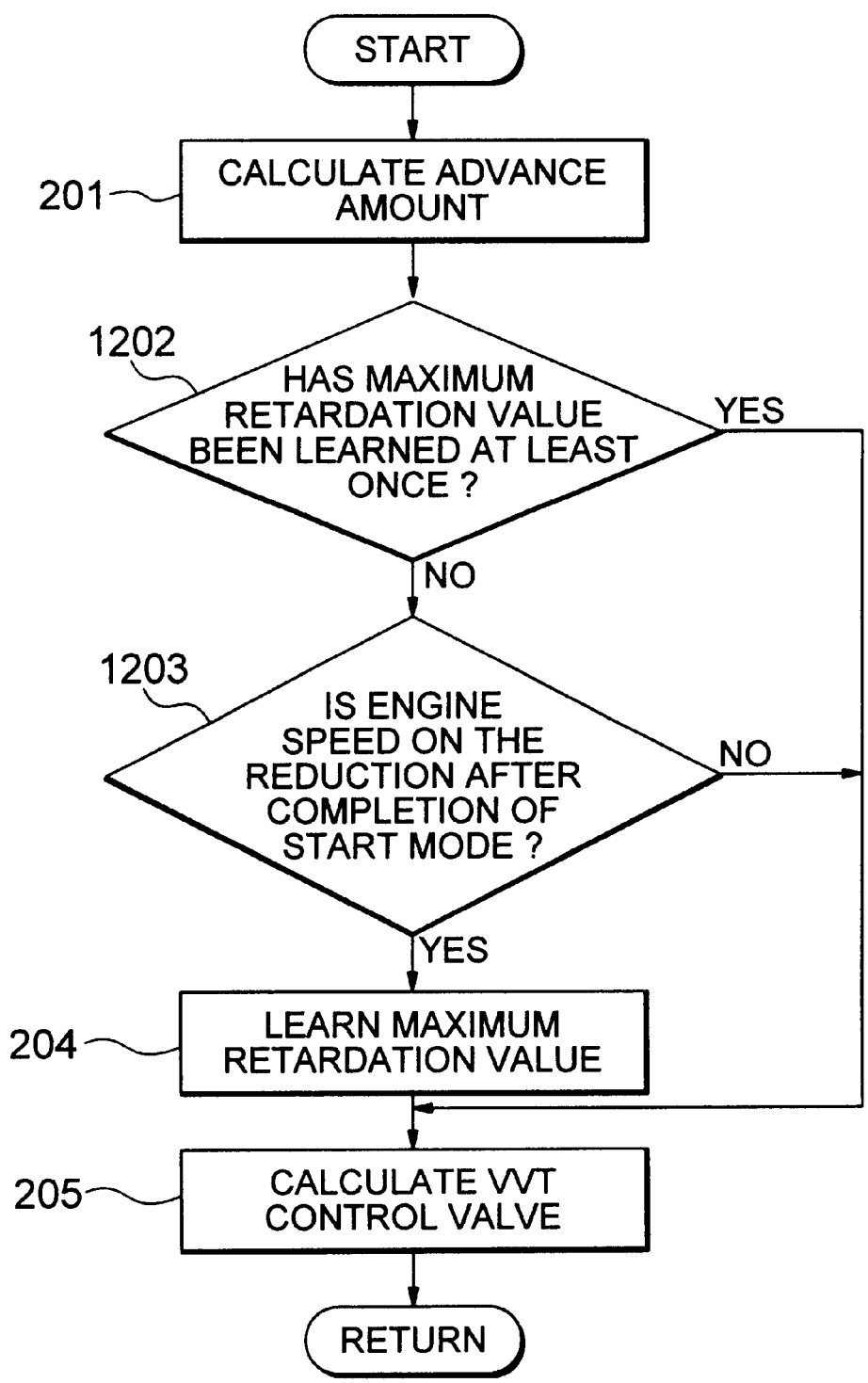
FIG. 12 is a flow chart showing the processing contents in a valve timing control system for an internal combustion engine according to an eighth embodiment of this invention.
Figure 13:
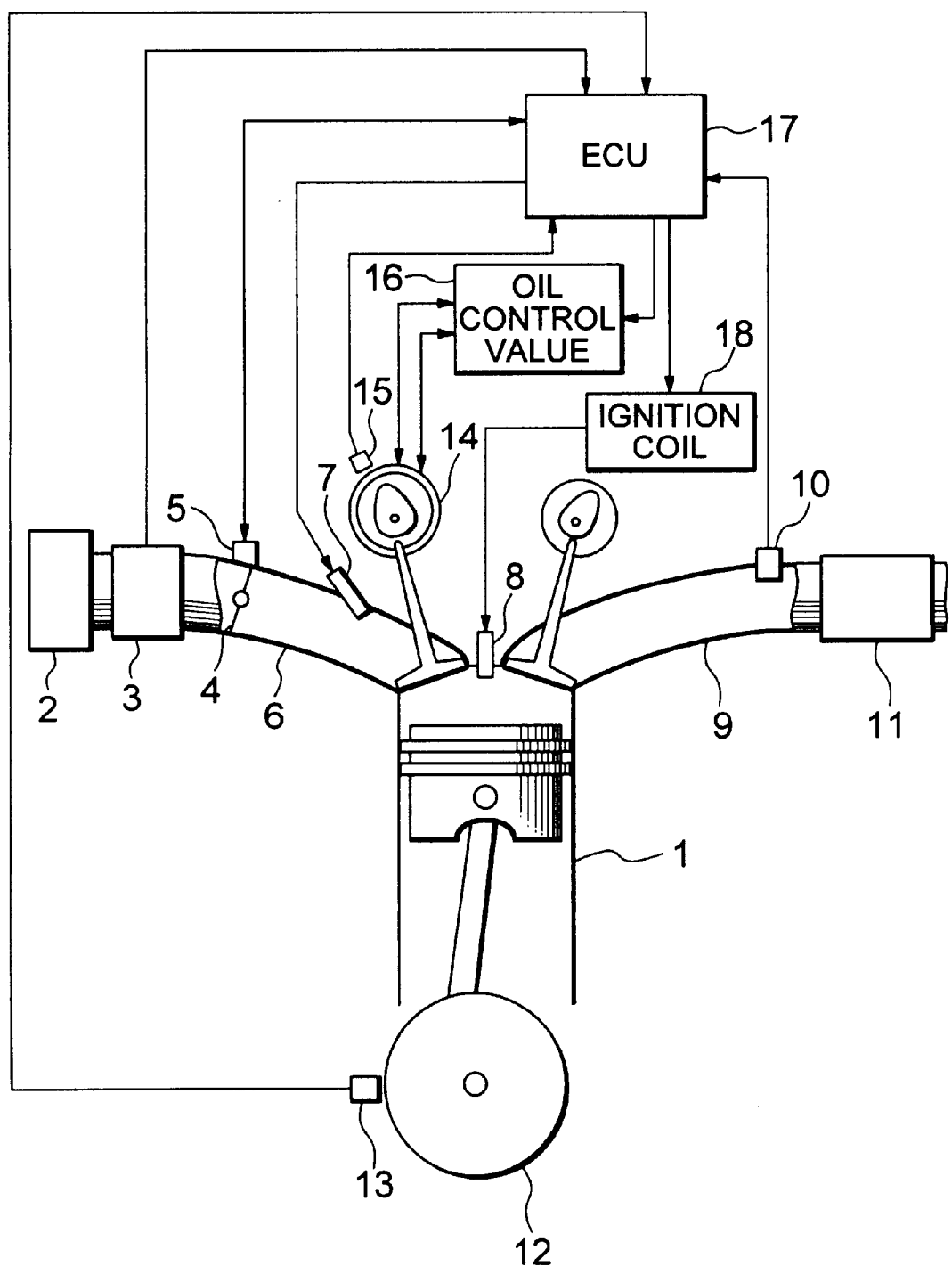
FIG. 13 is an conceptual illustration of a configuration of an internal combustion engine including a valve timing feature disclosed in Japanese Patent Application Laid-open No. 6-299876.
Figure 14:
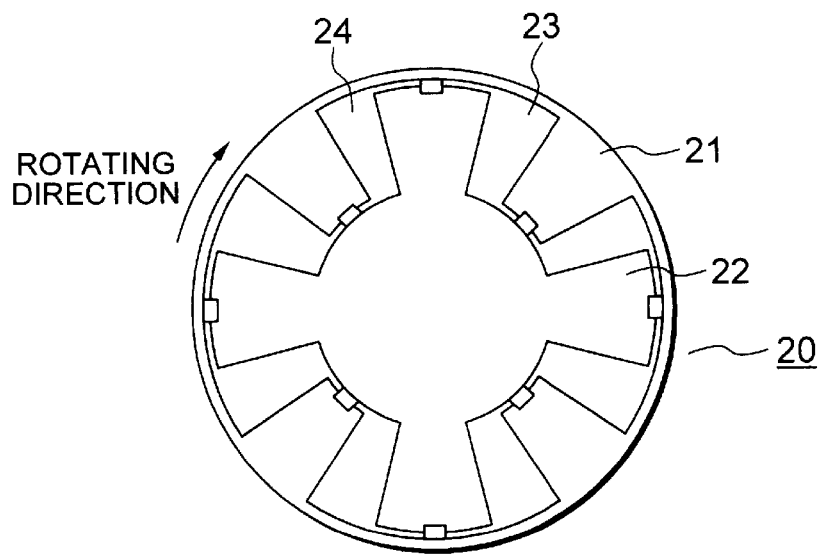
FIG. 14 is an enlarged illustration of an essential portion of a VVT actuator.
Figure 15:
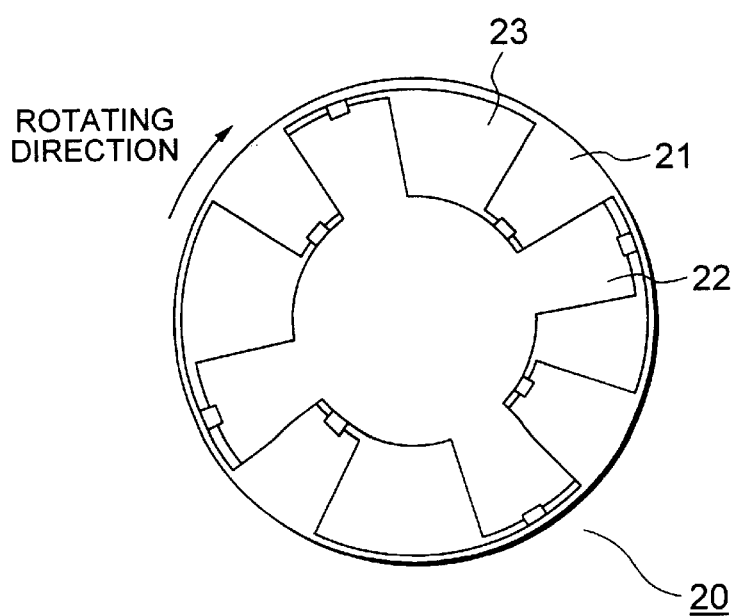
FIG. 15 is an enlarged illustration of an essential portion of the VVT actuator.
Figure 16:
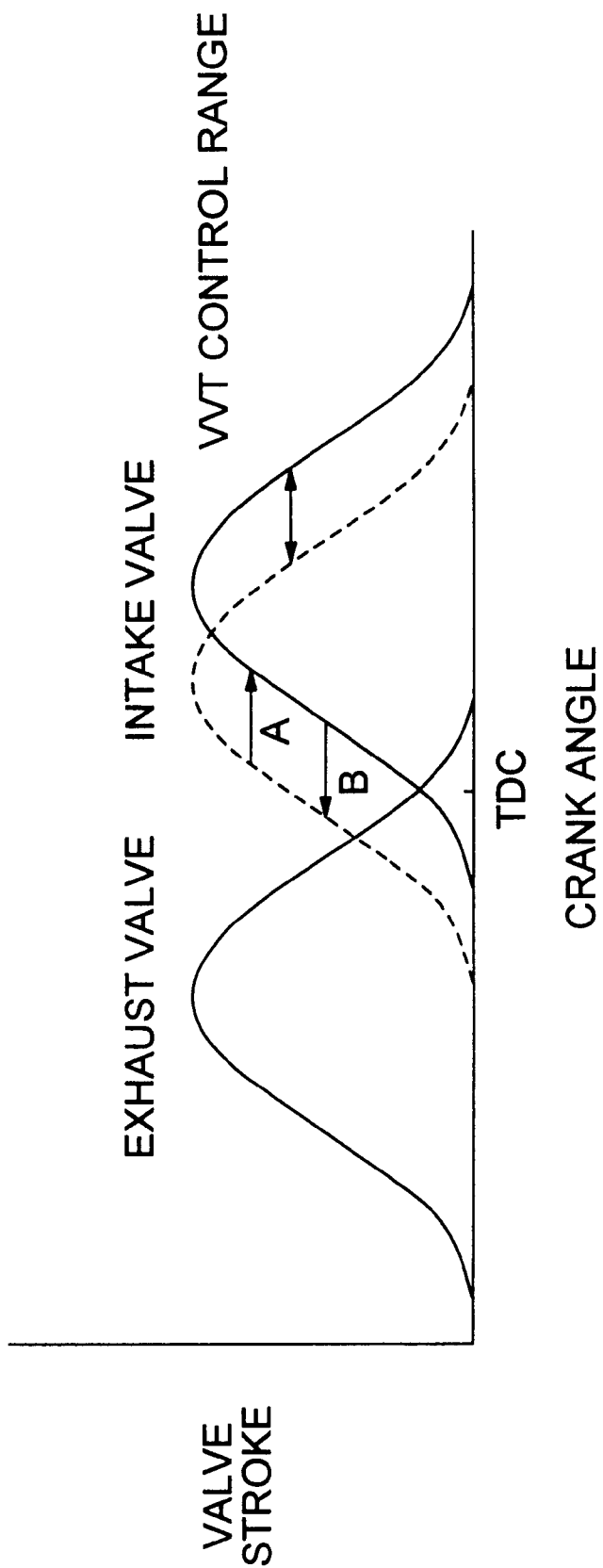
FIG. 16 is a graph of characteristics of the relationship between the valve timing and the valve overlap.
Figure 17:
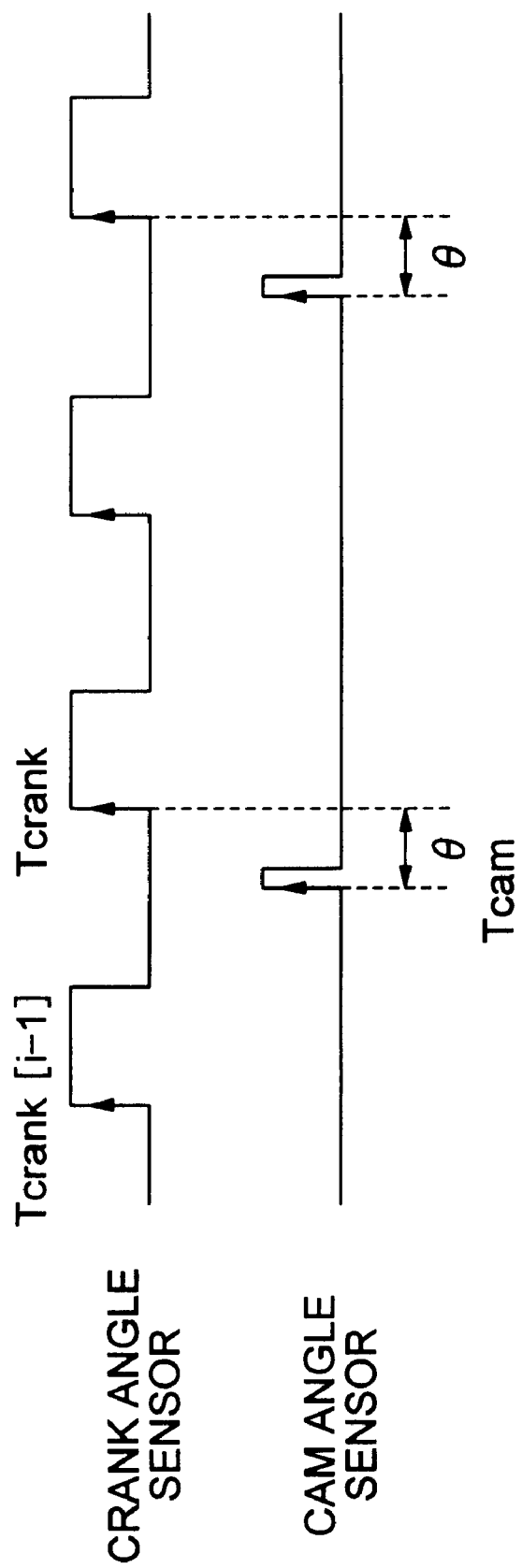
FIG. 17 is an illustration of examples of output signals from a crank angle sensor and a cam angle sensor.
Figure 18:
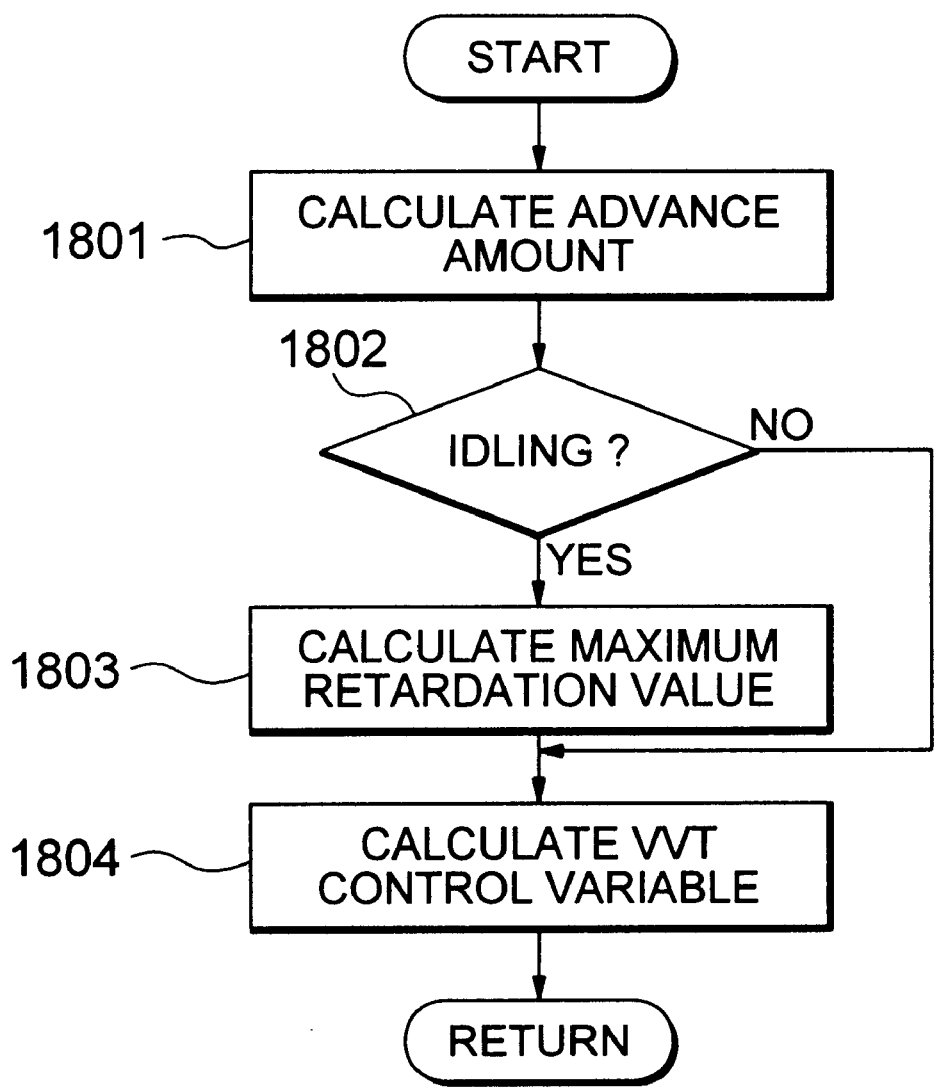
FIG. 18 is a flow chart showing the contents of processing in a conventional valve timing control system for an internal combustion engine.

FIG. 12 is a flow chart showing the processing contents in a valve timing control system for an internal combustion engine according to an eighth embodiment of this invention.

In FIG. 12, the processing contents of steps 201, 204 and 205 are identical to those in the first embodiment marked with the same numerals, and the repeat description thereof will be omitted.

A configuration of the internal combustion engine valve timing control system according to the eighth embodiment is similar to that of the first embodiment shown in FIG. 1. The steps 201, 1202, 1203, 204 and 205 are carried out by the ECU 25.

The ECU 25, after calculating an advance amount in the step 201, decides, in the step 1202, whether or not the maximum retardation value has been learned at least once.

If the determination of the step 1202 indicates that the maximum retardation value has never been learned, the flow proceeds to the step 1203 to determine whether or not the engine speed is decreasing after the end of the start mode.

If in step 1203 the engine speed is decreasing after the end of the start mode, the flow proceeds to the step 204 to learn the advance amount at that time as the maximum retardation value. Further, the flow proceeds to the step 205 to calculate a VVT control variable on the basis of the maximum retardation value learned in the step 204.

On the other hand, if in step 1202 the learning of the maximum retardation value has been done at least once, the flow proceeds to the step 205 to calculate the VVT controlled amount on the basis of the maximum retardation value learned in the operational processing in the previous cycles.

Similarly, if in 1203 the engine speed is not decreasing after the completion of the start mode, the flow proceeds to the step 205 to calculate the VVT control variable on the basis of the maximum retardation values learned in the operational processing in the previous cycles.

Moreover, the maximum retardation value learned in the step 204 is retained by a back-up power source even if the ignition switch is turned off, and remains unless the battery is removed.

The condition that "the maximum retardation value has never been learned" here signifies that the battery has been removed or that the battery has been discharged completely so that the learned maximum retardation value has been erased. Thus, when the ignition switch has been turned off after the maximum retardation value has been learned once and the ignition switch has been turned on again without removal or discharge of the battery, since the maximum retardation value learned in the step 204 of the operational processing in the previous cycle has been stored and retained in the ECU 25, the learning of the maximum retardation value is not done when the engine speed is decreasing after completion of the start mode as mentioned above.

According to the eighth embodiment of this invention, even if an internal combustion engine is started from a state where the maximum retardation value has never been learned, the learning of the present maximum retardation value becomes possible before the calculation of a VVT control variable. For instance, even when the difference between the desired maximum retardation value stored and retained in the ROM of the ECU 25 and the present maximum retardation value is increasing because of a change with the passage of time or the like, the present maximum retardation value is learned immediately after the start of the internal combustion engine when the lubricating oil pressure is high, which ensures high-precision valve timing control.

Furthermore, in an internal combustion engine, the combustion conditions are unstable immediately after the start thereof, and the original valve timing at the maximum retardation position can advance.

However, according to the eighth embodiment of this invention, the aforesaid control is implemented only when the maximum retardation value has never been learned, and when the learning of the maximum retardation value described in the first to seventh embodiments has been done at least once, the learning of the maximum retardation value by the control processing according to the eighth embodiment is not done, but is performed only when the learned maximum retardation value is removed from the ECU 25 because of removal of the battery or the like. In this way, the learning of the maximum retardation value in a state where the combustion condition is unstable immediately after the start of the internal combustion engine is limited to when there is no learned maximum retardation value in the ECU 25.

Accordingly, for instance, even in cases where the difference between the designed maximum retardation value and the actual maximum retardation value is large, the valve timing control becomes feasible with the maximum retardation value learned at that time, so that high-precision valve timing control is possible.

Although the first to eighth embodiments described above relate to an internal combustion engine equipped with a VVT mechanism on the intake side, this invention is also applicable to an internal combustion engine equipped with a VVT mechanism on the exhaust side, and in this case, equivalent effects can be produced.

Furthermore, on the exhaust side, the valve overlap becomes a minimum at a position (most advanced position) where the valve timing of the exhaust valve is advanced most.

Thus, when this invention is applied to an exhaust side VVT mechanism, the maximum retardation position of the valve timing of the intake valve in the above description is replaced with a maximum advance position of the valve timing of the exhaust valve, and a retardation value is calculated as a VVT control variable referring to the maximum advance position.

Moreover, in the above description, when this invention is applied to an intake side VVT mechanism, a VVT control variable is calculated referring to the maximum retardation position of the valve timing of the intake valve. However, since the VVT actuator 20 also stops mechanically when the valve timing of the intake valve is at the maximum advance position, even when the VVT control variable is calculated on the basis of a retardation value with this maximum advance position being used as a reference, the invention is similarly applicable thereto.

Also, when such control is employed for an internal combustion engine equipped with a VVT mechanism on the exhaust side, the VVT control variable is calculated referring to the maximum retardation position at which the valve overlap becomes a maximum.

It should be understood that the foregoing relates to only preferred embodiments of the present invention, and that it is intended to cover all changes and modifications of the embodiments of the invention used herein for the purpose of disclosure, which do not constitute departures from the spirit and scope of the invention.

What is claimed is:

1. A valve timing control system for an internal combustion engine which has a crank shaft and a cam shaft operatively connected with said crank shaft so as to rotate in synchronism therewith whereby intake and exhaust valves are driven to open and close by virtue of a valve operating mechanism mounted on said cam shaft in synchronism with the rotation of said crank shaft, said valve timing control system comprising:

crank angle detecting means for detecting a crank angle of said crank shaft in said internal combustion engine;

cam angle detecting means for detecting a cam angle of said cam shaft in said internal combustion engine;

advance amount calculating means for calculating an advance amount which is a phase difference between said crank angle and said cam angle;

variable valve timing means for advancing and retarding said cam angle with respect to said crank angle through the use of a lubricating oil pressure in said internal combustion engine;

learning means for learning a phase difference between said crank angle and said cam angle at a mechanically stopped position of said variable valve timing means; and valve timing control variable calculating means for calculating a valve timing control variable, for driving said variable valve timing means, on the basis of a deviation between said phase difference value learned by said learning means and said phase difference calculated by said advance amount calculating means, wherein said learning means learns said phase difference between said crank angle and said cam angle at said mechanically stopped position when said internal combustion engine is not idling.

2. A valve timing control system for an internal combustion engine according to claim 1, wherein said variable valve timing means is provided on an intake valve side of said internal combustion engine, and, when said variable valve timing means is at said mechanically stopped position and valve timing is at a maximum retardation position, said learning means learns the phase difference between the crank angle and the cam angle on the intake valve side.

3. A valve timing control system for an internal combustion engine according to claim 1, wherein said variable valve timing means is provided on an exhaust valve side of said internal combustion engine, and, when said variable valve timing means is at said mechanically stopped position and the valve timing is at a maximum advance position, said learning means learns the phase difference between the crank angle and the cam angle on the exhaust valve side.

4. A valve timing control system for an internal combustion engine according to claim 1, further comprising desired value calculating means for calculating a desired value of a deviation between said phase difference learned by said learning means and said phase difference calculated by said advance amount calculating means, with said learning means learning the phase difference between the crank angle and the cam angle when said desired value is zero.

5. A valve timing control system for an internal combustion engine according to claim 1, further comprising operating condition determining means for determining operating condition of said internal combustion engine, with said learning means learning the phase difference between the crank angle and the cam angle when said operating condition determining means determines that said internal combustion engine is decelerating.

6. A valve timing control system for an internal combustion engine according to claim 1, further comprising operating condition determining means for determining operating condition of said internal combustion engine, with said learning means learning the phase difference between the crank angle and the cam angle when said operating condition determining means determines that said internal combustion engine is under fuel shut-off control.

7. A valve timing control system for an internal combustion engine according to claim 1, further comprising operating condition determining means for determining operating condition of said internal combustion engine, with said variable valve timing means being set to control valve timing so that valve overlap between a time period for which an intake valve is in an open condition and a time period for which an exhaust valve is in an open condition is minimized when the speed of said internal combustion engine is higher than a predetermined value, and with said learning means learning the phase difference between the crank angle and the cam angle when said operating condition determining means determines that said engine speed is higher than said predetermined value.

8. A valve timing control system for an internal combustion engine according to claim 4, further comprising operating condition determining means determining operating condition of said internal combustion engine, with said learning means learning the phase difference between the crank angle and the cam angle after a predetermined period of time elapses from when said operating condition determining means determines that said desired value is zero, that said internal combustion engine is decelerating, that said internal combustion engine is under fuel shut-off control and that the speed of said internal combustion engine is higher than a predetermined value.

9. A valve timing control system for an internal combustion engine according to claim 8, wherein said predetermined period of time is longer than a delay from when said operating condition determining means determines that said desired value is zero, the determination that said internal combustion engine is decelerating, that said internal combustion engine is under fuel shut-off control and that the speed of said internal combustion engine is higher than said predetermined value until said valve timing control variable assumes zero.

10. A valve timing control system for an internal combustion engine according to claim 1, wherein said learning means learns the phase difference between the crank angle and the cam angle when said internal combustion engine is cold.

11. A valve timing control system for an internal combustion engine according to claim 1, wherein said learning means learns the phase difference between the crank angle and the cam angle when the speed of said internal combustion engine decreases to a normal idling speed from a condition of exceeding an idling speed immediately after said internal combustion engine is started.

12. A valve timing control system for an internal combustion engine according to claim 1, wherein said learning means learns the phase difference between the crank angle and the cam angle only when the learned phase difference is not stored and retained.

* * * * *